(12) United States Patent
Lussier et al.

(10) Patent No.: US 10,647,367 B2
(45) Date of Patent: May 12, 2020

(54) TRACK SYSTEM FOR TRACTION OF A VEHICLE

(71) Applicant: CAMSO INC., Magog (CA)

(72) Inventors: Alain Lussier, St-Francois Xavier de Brompton (CA); David Gingras, Magog (CA)

(73) Assignee: Camso Inc., Magog, QC ( * ) Notice: Subject to any disclaimer, the term of this patent is extended or adjusted under 35 U.S.C. 154(b) by 33 days.

(21) Appl. No.: 15/551,745

(22) PCT Filed: Feb. 18, 2016

(86) PCT No.: PCT/CA2016/050148
§ 371 (c)(1),
(2) Date: Aug. 17, 2017

(87) PCT Pub. No.: WO2016/131140
PCT Pub. Date: Aug. 25, 2016

(65) Prior Publication Data
US 2018/0022407 A1 Jan. 25, 2018

Related U.S. Application Data

(60) Provisional application No. 62/117,776, filed on Feb. 18, 2015, provisional application No. 62/188,564, filed on Jul. 3, 2015.

(51) Int. Cl.
*B62D 55/084* (2006.01)
*B62D 55/14* (2006.01)
(Continued)

(52) U.S. Cl.
CPC .......... *B62D 55/084* (2013.01); *B62D 55/10* (2013.01); *B62D 55/12* (2013.01); *B62D 55/15* (2013.01);
(Continued)

(58) Field of Classification Search
CPC ...... B62D 55/08; B62D 55/084; B62D 55/14; B62D 55/18; B62D 55/244
See application file for complete search history.

(56) References Cited

U.S. PATENT DOCUMENTS 1,506,431 A    8/1924   Kegresse
1,585,100 A *   5/1926   Kegresse ............. B62D 55/108
                                                   305/132
(Continued)

FOREIGN PATENT DOCUMENTS

CA        2977174      8/2016
DE        4230389 A1 *   4/1993 ............. B62D 55/14
(Continued)

OTHER PUBLICATIONS

International Search Report dated May 11, 2016 in connection with PCT Application No. PCT/CA2016/050148, 3 pages.

(Continued)

*Primary Examiner* — Tony H Winner
(74) *Attorney, Agent, or Firm* — Smart & Biggar LLP

(57) ABSTRACT

A track system for traction of a vehicle (e.g., a construction vehicle such as a compact track loader). The track system comprises a track comprising a ground-engaging outer side for engaging the ground and an inner side opposite to the ground-engaging outer side. The track system comprises a track-engaging arrangement for driving and guiding the track around the track-engaging arrangement. The track-engaging arrangement comprises a drive wheel for driving the track and a plurality of roller wheels for rolling on the inner side of the track along a bottom run of the track. The track system comprises a frame for supporting components of the track system, including the roller wheels. The frame may be configured to avoid constraining the roller wheels, which may allow the roller wheels to be wider and better distributed loading onto the track. A rolling contact interface (Continued)

between a roller wheel and the inner side of the track may be nonparallel to a widthwise direction of the track.

22 Claims, 23 Drawing Sheets

(51) Int. Cl.
    *B62D 55/12*     (2006.01)
    *B62D 55/24*     (2006.01)
    *B62D 55/15*     (2006.01)
    *B62D 55/30*     (2006.01)
    *B62D 55/10*     (2006.01)
    *B62D 55/108*     (2006.01)

(52) U.S. Cl.
    CPC ........... *B62D 55/244* (2013.01); *B62D 55/30* (2013.01); *B62D 55/1086* (2013.01); *B62D 55/14* (2013.01)

(56) References Cited

U.S. PATENT DOCUMENTS

| | | | | |
|---|---|---|---|---|
| 5,005,922 | A * | 4/1991 | Edwards | B62D 55/088 305/170 |
| 5,511,869 | A * | 4/1996 | Edwards | B62D 55/092 305/100 |
| 5,607,210 | A * | 3/1997 | Brazier | B62D 55/04 305/131 |
| 6,890,042 | B2 * | 5/2005 | Inaoka | B62D 55/244 180/9 |
| 7,866,420 | B1 * | 1/2011 | Claas | B62D 55/305 180/9.1 |
| 9,033,431 | B1 * | 5/2015 | Zuchoski | B62D 55/14 305/137 |
| 2003/0019133 | A1 * | 1/2003 | Hori | E02F 9/02 37/466 |
| 2010/0276990 | A1 * | 11/2010 | Zuchoski | B62D 55/065 305/130 |
| 2012/0012407 | A1 | 1/2012 | Daniels et al. | |
| 2012/0242142 | A1 * | 9/2012 | Kautsch | B62D 55/02 305/142 |
| 2013/0134772 | A1 * | 5/2013 | Dandurand | B62D 55/04 305/178 |
| 2013/0162016 | A1 * | 6/2013 | Lajoie | B62D 55/244 305/178 |
| 2014/0175864 | A1 | 6/2014 | Marchildon et al. | |
| 2016/0194038 | A1 * | 7/2016 | Jean | B62D 55/084 180/9.42 |

FOREIGN PATENT DOCUMENTS

| | | |
|---|---|---|
| EP | 2103508 | 9/2009 |
| EP | 3259174 | 12/2017 |
| JP | 2001146182 | 5/2001 |
| WO | 1998016419 | 4/1998 |
| WO | WO2016131140 | 8/2016 |

OTHER PUBLICATIONS

Written Opinion dated May 11, 2016 in connection with PCT Application No. PCT/CA2016/050148, 5 pages.
International Preliminary Report on Patentability dated May 11, 2016 in connection with PCT Application No. PCT/CA2016/050148, 6 pages.
European Search Report dated Sep. 24, 2018 in relation with European Patent application No. 16751858.8, 10 pages.

* cited by examiner

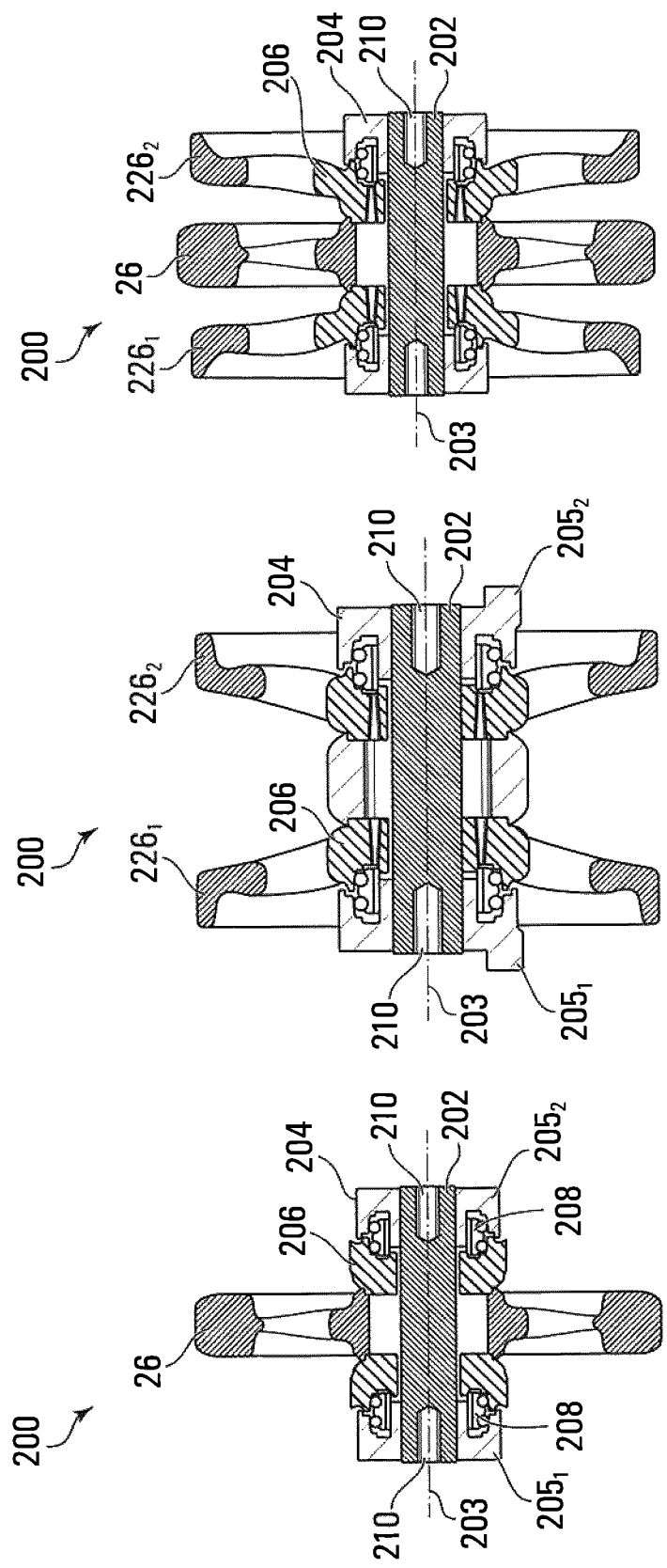

TRACK SYSTEM FOR TRACTION OF A VEHICLE

CROSS-REFERENCE TO RELATED APPLICATION

This application claims priority from U.S. Provisional Patent Application 62/117,776 filed on Feb. 18, 2015 and U.S. Provisional Patent Application 62/188,564 filed on Jul. 3, 2015, which are hereby incorporated by reference herein.

FIELD OF THE INVENTION

The invention relates generally to off-road vehicles (e.g., construction vehicles, agricultural vehicles, etc.) and, more particularly, to track systems for providing traction to such vehicles.

BACKGROUND

Certain off-road vehicles may be equipped with track systems which enhance their traction and floatation on soft, slippery and/or irregular grounds (e.g., soil, mud, sand, ice, snow, etc.) on which they operate.

Such track systems include a track which is driven and guided by a track-engaging arrangement. The track-engaging arrangement comprises a drive wheel to drive the track and one or more other wheels to guide and/or transfer loading to the track, such as one or more idler wheels and/or one or more roller wheels.

Interaction between the track-engaging arrangement and the track can create stresses leading to wear or other deleterious effects. For example, roller wheels may create stresses in certain regions of the track that can cause wear or other deterioration of the track.

For these and other reasons, there is a need for improvements in track systems for traction of vehicles.

SUMMARY OF THE INVENTION

In accordance with a broad aspect, there is provided a track system for traction of a vehicle. The track system comprises a track to engage the ground. The track comprises elastomeric material, a ground-engaging outer side, an inner side opposite to the ground-engaging outer side, and lateral edges. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel and the roller wheels. A distance between an axis of rotation of the drive wheel and an axis of rotation of the leading idler wheel is different from a distance between the axis of rotation of the drive wheel and an axis of rotation of the trailing idler wheel. The frame is free of supporting structure for the roller wheels between the roller wheels and the lateral edges of the track.

In accordance with another aspect, there is provided a track system for traction of a vehicle. The track system comprises a track to engage the ground. The track comprises elastomeric material, a ground-engaging outer side, an inner side opposite to the ground-engaging outer side, and lateral edges. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The frame is configured such that at least a majority of each of the roller wheels is exposed when viewing the track system in a widthwise direction of the track system.

In accordance with another aspect, there is provided a track system for traction of a vehicle. The track system comprises a track to engage the ground. The track comprises elastomeric material, a ground-engaging outer side, an inner side opposite to the ground-engaging outer side, and lateral edges. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The frame extends between laterally-adjacent ones of the roller wheels that are adjacent to one another in a widthwise direction of the track system.

In accordance with another aspect, there is provided a track system for traction of a vehicle. The track system comprises a track to engage the ground. The track comprises elastomeric material, a ground-engaging outer side, an inner side opposite to the ground-engaging outer side, and lateral edges. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. A ratio of a total width of peripheral surfaces of laterally-adjacent ones of the roller wheels that are adjacent to one another in a widthwise direction of the track system over a width of the track is at least 0.28.

In accordance with another aspect, there is provided a track system for traction of a vehicle. The track system comprises a track to engage the ground and a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The track comprises elastomeric material, a ground-engaging outer side, an inner side opposite to the ground-engaging outer side, lateral edges, and a plurality of cores at least partially embedded in the elastomeric material. Each core of the plurality of cores extends transversally to a longitudinal direction of the track. A ratio of a length of the core over a width of the track is no more than 0.85.

In accordance with another aspect, there is provided a track system for traction of a vehicle. The track system comprises a track to engage the ground. The track comprises elastomeric material, a ground-engaging outer side, an inner side opposite to the ground-engaging outer side, lateral edges, and a plurality of cores at least partially embedded in the elastomeric material. Each core of the plurality of cores extends transversally to a longitudinal direction of the track. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The core does not extend beyond outer lateral edges of each of the roller wheels in a widthwise direction of the track system.

In accordance with another aspect, there is provided a track system for traction of a vehicle. The vehicle comprises a frame. The track system comprises a track to engage the ground. The track comprises elastomeric material, a ground-engaging outer side, and an inner side opposite to the ground-engaging outer side. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The track system also comprises a mount for resiliently interconnecting the frame of the track system and the frame of the vehicle.

In accordance with another aspect, there is provided a track system for traction of a vehicle. The vehicle comprises a frame. The track system comprises a track to engage the ground. The track comprises elastomeric material, a ground-engaging outer side, and an inner side opposite to the ground-engaging outer side. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The track system also comprises a mount for slidably mounting the track system to the frame of the vehicle.

In accordance with another aspect, there is provided a track system for traction of a vehicle. The track system comprises a track to engage the ground. The track comprises elastomeric material, a ground-engaging outer side, and an inner side opposite to the ground-engaging outer side. The track system also comprises a track-engaging arrangement to drive and guide the track around the track-engaging arrangement. The track-engaging arrangement comprises a drive wheel to impart movement to the track, a plurality of roller wheels to roll on a bottom run of the track, and a shaft carrying laterally-adjacent ones of the roller wheels which are adjacent to one another in a widthwise direction of the track such that the shaft and the laterally-adjacent ones of the roller wheels are rotatable together.

In accordance with another aspect, there is provided a track system for traction of a vehicle. The track system comprises a track to engage the ground. The track comprises elastomeric material, a ground-engaging outer side, and an inner side opposite to the ground-engaging outer side. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, a frame supporting the leading idler wheel, the trailing idler wheel, and the roller wheels, and a resilient mount between laterally-adjacent ones of the roller wheels that are adjacent to one another in a widthwise direction of the track system and the frame of the track system. A distance between an axis of rotation of the drive wheel and an axis of rotation of the leading idler wheel is different from a distance between the axis of rotation of the drive wheel and an axis of rotation of the trailing idler wheel.

In accordance with another aspect, there is provided a track system for traction of a vehicle. The track system comprises a track to engage the ground. The track comprises elastomeric material, a ground-engaging outer side, and an inner side opposite to the ground-engaging outer side. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The drive wheel comprises a plurality of drive wheel members that are separately mountable into and removable from the track system.

In accordance with another aspect, there is provided a track system for traction of a vehicle. The track system comprises a track. The track comprises a ground-engaging outer side for engaging the ground, and an inner side opposite to the ground-engaging outer side. The track comprises elastomeric material and a plurality of cores at least partially embedded in the elastomeric material. Each core of the plurality of cores extends transversally to a longitudinal direction of the track. The track system also comprises a track-engaging arrangement for driving and guiding the track around the track-engaging arrangement. The track-engaging arrangement comprises a drive wheel for driving the track and a plurality of roller wheels for rolling on the inner side of the track along a bottom run of the track. A rolling contact interface between a roller wheel of the plurality of roller wheels and the inner side of the track is nonparallel to a widthwise direction of the track.

In accordance with another aspect, there is provided a track for traction of a vehicle. The track is mountable around a track-engaging arrangement for driving and guiding the track around the track-engaging arrangement. The track-engaging arrangement comprises a drive wheel for drive the track and a plurality of roller wheels for rolling along a bottom run of the track. The track comprises a ground-engaging outer side for engaging the ground, an inner side opposite to the ground-engaging outer side, elastomeric material, and a plurality of cores at least partially embedded in the elastomeric material. Each core of the plurality of cores extends transversally to a longitudinal direction of the track. The inner side comprises a rolling path for a roller wheel of the plurality of roller wheels. The rolling path is nonparallel to a widthwise direction of the track.

In accordance with another aspect, there is provided a roller wheel for a track system for traction of a vehicle. The track system comprises a track. The track comprises a ground-engaging outer side for engaging the ground, an inner side opposite to the ground-engaging outer side, elastomeric material, and a plurality of cores at least partially embedded in the elastomeric material. Each core of the plurality of cores extends transversally to a longitudinal direction of the track. The track system comprises a drive wheel for driving the track. The roller wheel is configured to roll on the inner side of the track along a bottom run of the track. The roller wheel comprises a first lateral surface and a second lateral surface opposite one another. The roller wheel also comprises a peripheral surface between the first lateral surface and the second lateral surface and configured to roll on the inner side of the track. The peripheral surface is nonparallel to an axis of rotation of the roller wheel.

In accordance with another aspect, there is provided a track system for traction of a vehicle. The track system comprises a track to engage the ground. The track comprises elastomeric material, a ground-engaging outer side, an inner side opposite to the ground-engaging outer side, and lateral edges. The track system also comprises a track-engaging arrangement to drive and guide the track around the track-engaging arrangement. The track-engaging arrangement comprises a drive wheel to impart movement to the track, a leading idler wheel and a trailing idler wheel spaced apart in a longitudinal direction of the track system, a plurality of roller wheels between the leading idler wheel and the trailing idler wheel, and a frame supporting the leading idler wheel, the trailing idler wheel, and the roller wheels. A distance between an axis of rotation of the drive wheel and an axis of rotation of the leading idler wheel is different from a distance between the axis of rotation of the drive wheel and an axis of rotation of the trailing idler wheel. The track system comprises a tensioner to maintain the track in tension. The tensioner comprises a piston-cylinder mechanism and a fluidic accumulator that are disposed between the lateral edges of the track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 20 to 22 show different embodiments of an idler wheel assembly of the track system;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
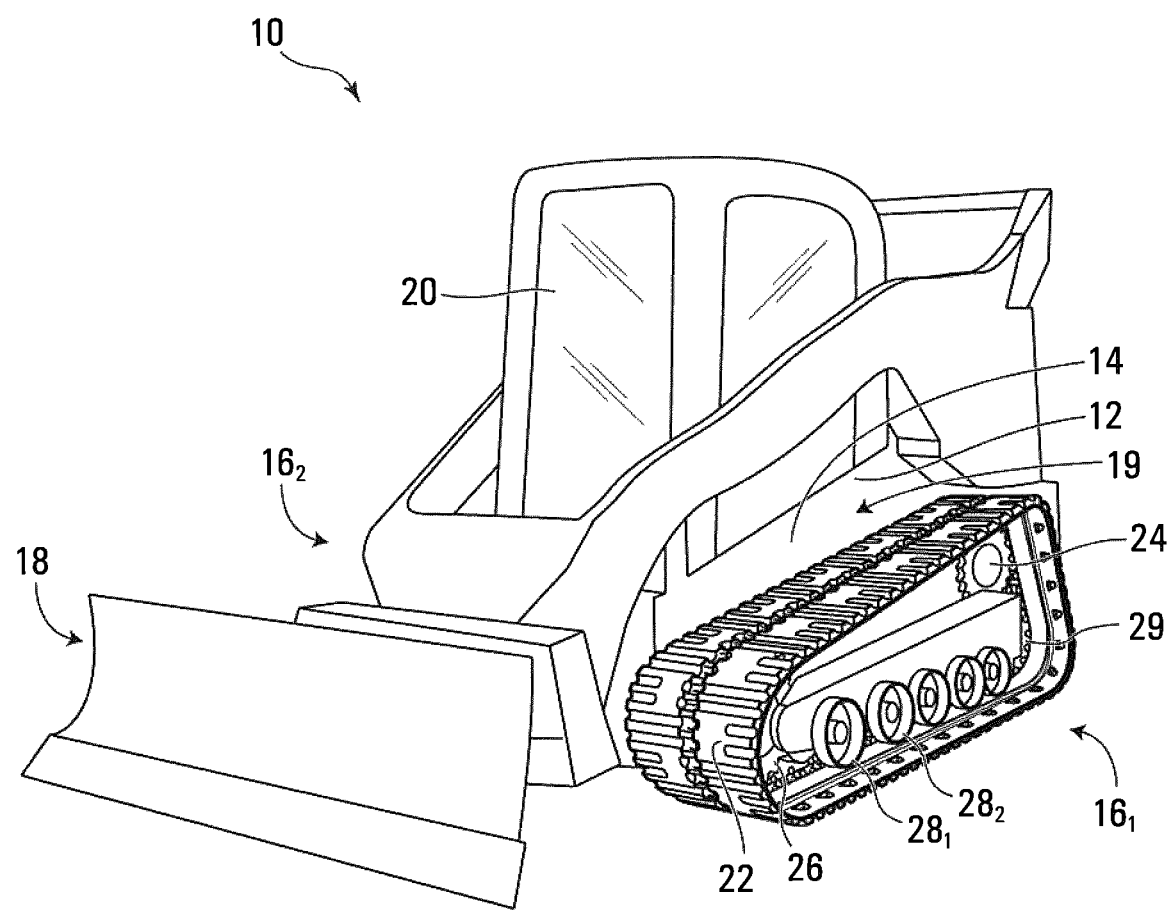
FIG. 1 shows a tracked vehicle in accordance with an embodiment of the invention.

FIG. 1 shows a tracked vehicle 10 in accordance with an embodiment of the invention. In this embodiment, the tracked vehicle 10 is a construction vehicle for performing construction work. More particularly, in this example, the construction vehicle 10 is a compact track loader. For instance, in some embodiments, the compact track loader may have a height $V_H$ of about 80 inches, a width $V_W$ of about 70 inches and a length $V_L$ of about 140 inches, and may weigh around 9000 lbs.

The vehicle 10 comprises a frame 12 supporting a powertrain 19, a pair of track systems $16_1$, $16_2$ (which can be referred to as "undercarriages"), and an operator cabin 20, from which an operator can control the vehicle 10 to move it on the ground and perform construction work using a work implement 18.

The powertrain 19 comprises a prime mover 14 which is a source of motive power to move the vehicle 10. For example, the prime mover 14 may comprise an internal combustion engine and/or one or more other types of motors (e.g., electric motors, etc.) for generating motive power to move the vehicle 10. The prime mover 14 is in a driving relationship with each of the track systems $16_1$, $16_2$. That is, power derived from the prime mover 14 is transmitted to each of the track systems $16_1$, $16_2$ via the powertrain 19 of the vehicle 10.

The work implement 18 is used to perform construction work. In this embodiment where the vehicle 10 is a loader, the work implement 18 is a dozer blade that can be used to push objects and shove soil, debris or other material. In other embodiments, the work implement 18 may take on various other forms, such as a backhoe, a bucket, a fork, a grapple, a scraper pan, an auger, a saw, a ripper, a material handling arm, or any other type of construction working implement.

The operator cabin 20 is where the operator sits and controls the vehicle 10. More particularly, the operator cabin 20 comprises a set of controls that allow the operator to steer the vehicle 10 on the ground and perform construction work using the working implement 18.

Figure 2:
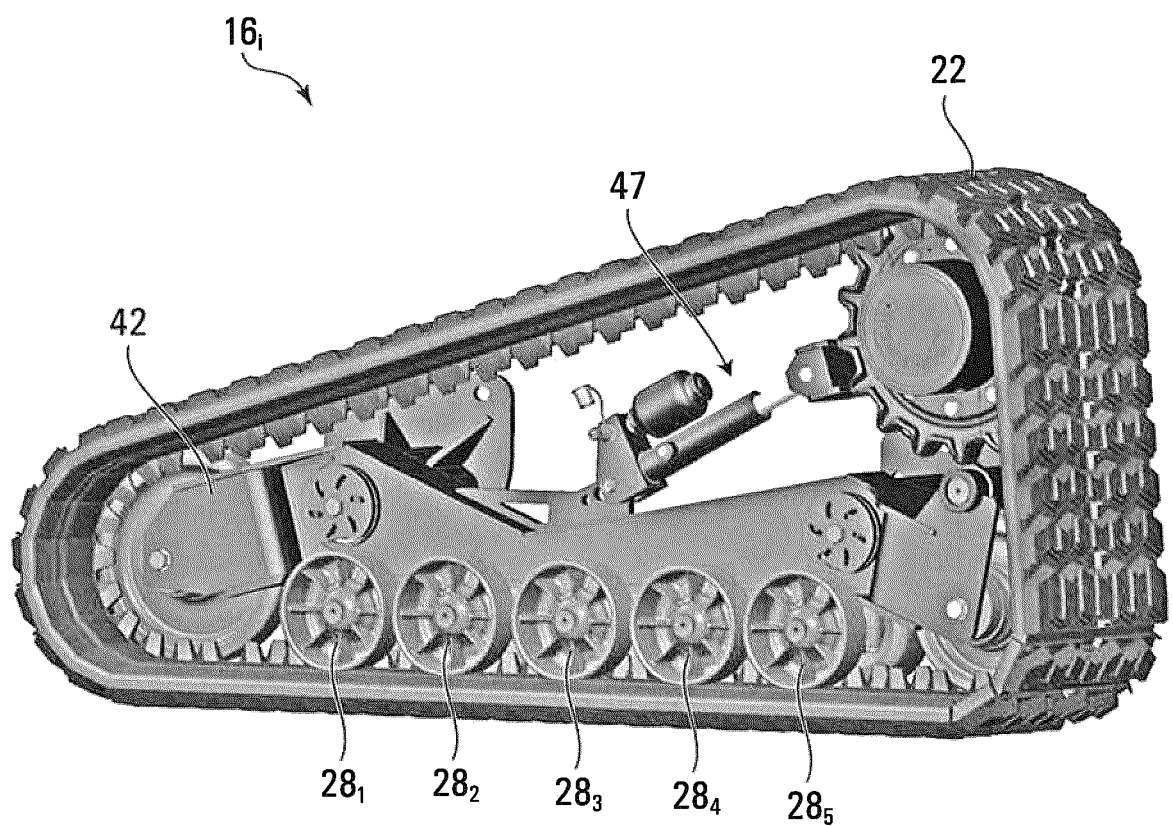
FIG. 2 shows a perspective of a track system of the tracked vehicle.

The track systems $16_1$, $16_2$ are drivable by the prime mover 14 and engage the ground to propel the vehicle 10 on the ground. With additional reference to FIG. 2, in this embodiment, each track system 16 comprises a track 22 and a track-engaging arrangement 39 for driving and guiding the track 22 around the track-engaging arrangement 39. In this embodiment, the track-engaging arrangement 39 comprises a frame 42 and a plurality of wheels, which includes a drive wheel 24, a front (leading) idler wheel 26, a rear (trailing) idler wheel 29, and a plurality of roller wheels $28_1$-$28_{10}$. In this example, the track system $16_i$ also comprises a tensioner 47 for adjusting a tension of the track 22. The track system $16_i$ has a longitudinal axis 17 defining a longitudinal direction of the track system $16_i$. The track system $16_i$ also has a widthwise direction and a height direction that are normal to its longitudinal direction.

The drive wheel 24 is rotatable by power derived from the prime mover 14 for imparting movement of the track 22 in order to propel the vehicle 10 on the ground. The idler wheels 26, 29 and the roller wheels $28_1$-$28_{10}$ do not convert power supplied by the prime mover 14 to motive force, but rather guide the track 22 and/or maintain it under tension as it is driven by the drive wheel 24. The frame 42 supports components of the track system $16_i$, including the idler wheels 26, 29 and the roller wheels $28_1$-$28_{10}$. As the track 22 is driven by the drive wheel 24, the roller wheels $28_1$-$28_{10}$ roll on a bottom run 61 of the track 22 to apply it on the ground for traction.

In this embodiment, the track system $16_i$ has a generally triangular configuration in which an axis of rotation 21 of the drive wheel 24 is spaced from axes of rotation 41, 43 of the front and rear idler wheels 26, 29. More particularly, in this embodiment, the axis of rotation 21 of the drive wheel 24 is spaced from the axes of rotation 41, 43 of the front and rear idler wheels 26, 29 in the height direction of the track system $16_i$ and in the longitudinal direction of the track system $16_i$. In this example, a distance between the axis of rotation 21 of the drive wheel 24 and the axis of rotation 41 of the front idler wheel 26 is different from a distance between the axis of rotation 21 of the drive wheel 24 and the axis of rotation 43 of the rear idler wheel 29. More specifically, in this example, the distance between the axis of rotation 21 of the drive wheel 24 and the axis of rotation 41 of the front idler wheel 26 is greater than the distance between the axis of rotation 21 of the drive wheel 24 and the axis of rotation 43 of the rear idler wheel 29. Thus, the axis of rotation 21 of the drive wheel 24 is closer to a given one of the axes of rotation 41, 43 of the front and rear idler wheels 26, 29 in the longitudinal direction of the track system $16_i$ than to the other one of the axes of rotation 41, 43 of the front and rear idler wheels 26, 29. Specifically, in this case, the axis of rotation 21 of the drive wheel 24 is closer to the axis of rotation 43 of the rear idler wheel 29 in the longitudinal direction of the track system $16_i$ than to the axis of rotation 41 of the front idler wheel 26. The drive wheel 24 is therefore elevated and asymmetrically disposed longitudinally relative to the front and rear idler wheels 26, 29.

The track 22 engages the ground to provide traction to the vehicle 10. With additional reference to FIGS. 3 and 4, the track 22 comprises an inner side 25, a ground-engaging outer side 27, and lateral edges $31_1$, $31_2$. The inner side 25 faces the wheels 24, 26, 29, $28_1$-$28_{10}$ and defines an inner area of the track system $16_i$ in which these wheels rotate. The ground-engaging outer side 27 engages the ground for traction of the vehicle 10. A top run 63 of the track 22 extends between longitudinal ends 54, 55 of the track system $16_i$ and over the wheels 24, 26, 29, $28_1$-$28_{10}$, while the bottom run 61 of the track 22 extends between the longitudinal ends 54, 55 of the track system $16_i$ and under the wheels 24, 26, 29, $28_1$-$28_{10}$. In view of its closed configuration without ends that allows it to be disposed and moved around the track-engaging arrangement 39, the track 22 can be referred to as an "endless" track.

The track 22 has a length defining a longitudinal axis 45 and a width defined by its lateral edges $31_1$, $31_2$. The track 22 thus has a longitudinal direction (i.e., a direction generally parallel to its longitudinal axis 45) and transversal directions (i.e., directions transverse to its longitudinal axis 45), including a widthwise direction (i.e., a lateral direction generally perpendicular to its longitudinal axis 45). The track 22 also has a thickness which defines a thickness direction thereof.

The inner side 25 of the track 22 contacts the wheels 24, 26, 29, $28_1$-$28_{10}$ as the track 22 is in motion around these wheels. Motion of the track 22 is imparted by the drive wheel 24. More particularly, in this embodiment, the drive wheel 24 is a drive sprocket and the track 22 comprises a plurality of openings $33_1$-$33_N$ which cooperate with teeth of the drive wheel 24 in order to drive the track 22. As it is driven, the track 22 contacts the idler wheels 26, 29 and the roller wheels $28_1$-$28_{10}$ which help guide the track 22 and maintain it under tension. For instance, a peripheral surface 75 of each roller wheel $28_i$ between an outer lateral surface 35 and an inner lateral surface 49 of the roller wheel $28_i$ is in rolling contact with the inner side 25 of the track 22. More specifically, the inner side 25 comprises rolling paths $30_1$, $30_2$ (i.e., contact interfaces) on which the wheels $28_1$-$28_{10}$ roll to apply the bottom run 61 of the track 22 onto the ground.

The ground-engaging outer side 27 comprises a tread 40 to enhance traction on the ground. The tread 40 comprises a plurality of traction projections $68_1$-$68_T$ distributed on the ground-engaging outer side 27 for enhancing traction on the ground. The tread 40 may have any suitable configuration.

The track 22 is elastomeric, i.e., comprises elastomeric material, to be flexible around the track-engaging arrangement 39. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an elastomeric body 36 underlying the inner side 25 and the ground-engaging outer side 27. In view of its underlying nature, the body 36 will be referred to as a "carcass". The carcass 36 is elastomeric in that it comprises elastomeric material 38 which allows the carcass 36 to elastically change in shape as the track 22 is in motion around the wheels 24, 26, 29, $28_1$-$28_{10}$. A plurality of cores $44_1$-$44_N$ are at least partially embedded in the elastomeric material 38. Also, in this embodiment, a layer of reinforcing cables $37_1$-$37_M$ is embedded in the elastomeric material 38. The carcass 36 may comprise one or more additional and/or different components, such as one or more other reinforcements (e.g., one or more layers of reinforcing fabrics), embedded in the elastomeric material 38, in other embodiments.

The reinforcing cables $37_1$-$37_M$ extend generally parallel to one another and in the longitudinal direction of the track 22 to enhance strength in tension of the track 22 along its longitudinal direction. In this embodiment, each of the reinforcing cables $37_1$-$37_M$ is a cord or wire rope including a plurality of strands or wires. In other embodiments, each of the reinforcing cables $37_1$-$37_M$ may be another type of cable and may be made of any suitable material (e.g., metal, plastic, or composite material).

The cores $44_1$-$44_N$ are distributed along and extend transversally to the longitudinal direction of the track 22 to impart transverse rigidity to the track 22. The cores $44_1$-$44_N$ may also help to drive the track 22 by engagement with the drive wheel 24 and/or guide some of the wheels 24, 26, 29, $28_1$-$28_{10}$ as the track 22 is driven by the drive wheel 24.

Each core $44_i$ has a longitudinal axis extending transversally (in this case, perpendicularly) to the longitudinal axis 45 of the track 22. In this embodiment, the core $44_i$ has a length which is shorter than the width of the track 22 such that it has a first longitudinal end $48_1$ and a second longitudinal end $48_2$ that are spaced apart from the lateral edges $31_1$, $31_2$ of the track 22. That is, the first longitudinal end $48_1$ of the core $44_i$ is spaced apart from the first lateral edge $31_1$ of the track 22 along the track's widthwise direction, and the second longitudinal end $48_2$ of the core $44_i$ is spaced apart from the second lateral edge $31_2$ of the track 22 along the track's widthwise direction.

More particularly, in this embodiment, each core $44_i$ comprises a pair of wings $50_1$, $50_2$ (i.e., extensions) and a wheel guide 52.

The wings $50_1$, $50_2$ are elongated along the longitudinal axis of the core $44_i$ to impart transverse rigidity to the track 22. Each of the wings $50_1$, $50_2$ has a top surface oriented towards the inner side 25 of the track 22 and a bottom surface oriented towards the ground-engaging outer side 27 of the track 22. In this embodiment, each of the wings $50_1$, $50_2$ has a tapered shape whereby its top surface converges longitudinally outwardly towards its bottom surface. The wings $50_1$, $50_2$ may have various other shapes in other embodiments.

The wheel guide 52 is located between the pair of wings $50_1$, $50_2$ and serves to guide some of the wheels 24, 26, 29, $28_1$-$28_{10}$ as the track 22 is driven by the drive wheel 24. More particularly, in this embodiment, the wheel guide 52 comprises a pair of guide projections $56_1$, $56_2$ that project on the inner side 25 of the track 22. Each guide projection $56_i$ comprises a top end, a base, and a pair of wheel-facing sides opposite one another and extending from its base to its top end. The wheel guide 52 may be configured in various other ways in other embodiments (e.g., it may comprise only one guide projection or more than two (2) guide projections).

In this embodiment, the core 44, including its wings $50_1$, $50_2$ and wheel guide 52, is made of metallic material. For instance, in some embodiments, the core $44_i$ may be made of steel formed into shape by casting. The core $44_i$ may have various other shapes, may comprise various other components, may be made of various other rigid materials (e.g., polymers, ceramics, composites, etc.), and/or may be made using various other processes (e.g., forging, welding, fastening, etc.) in other embodiments.

The track system $16_i$ may have various features to facilitate its use and/or enhance its performance and/or that of the vehicle 10 in various embodiments, examples of which will now be discussed.

I. Widthwise Extent of the Frame and other Components of the Track System

In some embodiments, the frame 42 of the track system $16_i$ may be designed to minimize a restriction on a size of the roller wheels $28_1$-$28_{10}$ and/or other components of the track system $16_i$.

Figure 6:
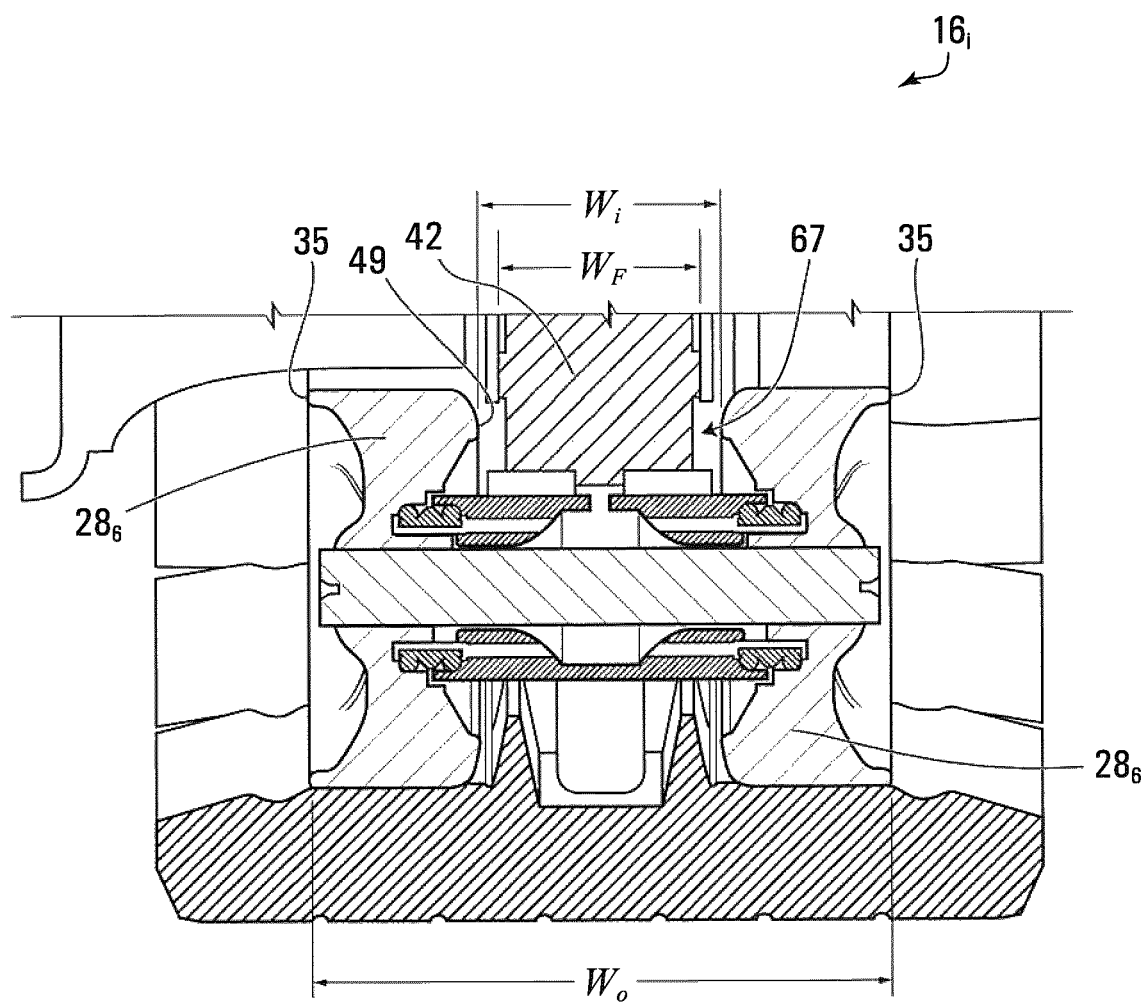
FIG. 6 shows a cross-sectional view of a portion of the track system, including a frame and roller wheels of the track system.

For example, in this embodiment, as shown in FIG. 6, the frame 42 of the track system 16 is configured to avoid confining the roller wheels $28_1$-$28_{10}$ laterally outwardly, i.e., towards the laterals edges $31_1$, $31_2$ of the track 22. This may allow the roller wheels $28_1$-$28_{10}$ to be wider and thus better distributed loading onto the track 22.

More particularly, in this embodiment, the frame 42 of the track system $16_i$ is free of supporting structure between the roller wheels $28_1$-$28_{10}$ and the lateral edges $31_1$, $31_2$ of the track 22. That is, there is no supporting structure for the roller wheels $28_1$-$28_{10}$ located between the roller wheels $28_1$-$28_{10}$ and the lateral edges $31_1$, $31_2$ of the track 22. Rather, there is nothing from the track system $16_i$ between the roller wheels $28_1$-$28_{10}$ and the lateral edges $31_1$, $31_2$ of the track 22. The frame 42 therefore does not overlap with the roller wheels $28_1$-$28_{10}$ in the height direction of the track system $16_i$ between the roller wheels $28_1$-$28_{10}$ and the lateral edges $31_1$, $31_2$ of the track 22. As a result, at least a majority of, and in this case an entirety, of each of the roller wheels $28_1$-$28_{10}$ is exposed when viewing the track system $16_i$ in the widthwise direction of the track system $16_i$.

In this embodiment, the frame 42 extends in a space 67 between laterally-adjacent ones of the roller wheels $28_1$-$28_{10}$ that are adjacent to one another in the widthwise direction of the track system $16_i$. The frame 42 thus supports the laterally-adjacent ones of the roller wheels $28_1$-$28_{10}$ from in between them.

More particularly, in this embodiment, the frame 42 is generally centered in the widthwise direction of the track system $16_i$ relative to a wheel-assembly of the roller wheels $28_1$-$28_{10}$. As used here, the expression "wheel-assembly" refers to at least two wheels $28_i$, $28_j$ of the wheels $28_1$-$28_{10}$ that are transversally mounted and rotate about a common axis (e.g., wheels $28_1$ and $28_6$).

In order to minimize a restriction of the size of the wheels $28_1$-$28_{10}$ (e.g., a width $W_R$ of the peripheral surface 75 of the wheels $28_1$-$28_{10}$ with the track 22), in this embodiment, a widthwise extent $W_F$ of the frame 42 of the track system $16_i$ (i.e., an extent of the frame 42 taken along the widthwise direction of the track system $16_i$) is made smaller than a distance $W_o$ measured between the outer lateral edges 35 of the wheels $28_i$, $28_j$ of a wheel-assembly (the outer lateral edge 35 of each of the wheels $28_i$, $28_j$ is the edge that is closest to either of the lateral edges $31_1$, $31_2$ of the track 22). More specifically yet, in this embodiment, the widthwise extent $W_F$ of the frame 42 is made smaller than a distance $W_i$ measured between the inner lateral edges 49 of the wheels $28_i$, $28_j$ of a wheel-assembly. This makes it possible to locate the frame 42 between the wheels $28_i$, $28_j$, such as to reduce the overall height of the track assembly $16_i$ and at the same time make it possible to use wheels $28_1$-$28_{10}$ of a larger width to better support a ground engaging run of the track 22.

Since the width $W_R$ of the peripheral surface 75 of the wheels $28_1$-$28_{10}$ in contact with the track 22 is not restricted by the frame 42, a total width $W_{RT}$ of the peripheral surfaces 75 of the wheels $28_1$-$28_{10}$ of a lateral wheel-assembly may be increased ($W_{RT}$=N×$W_R$, where N is the number of wheels that are part of the wheel-assembly). For instance, in some cases, a ratio $W_{RT}/W_T$ of the total width $W_{RT}$ of the peripheral surfaces 75 of the wheels $28_1$-$28_{10}$ of a wheel-assembly over the width $W_T$ of the track 22 may be at least 0.28, in some cases at least 0.3, in some cases at least 0.35, in some cases at least 0.4, in some cases at least 0.45 and in some cases even more than 0.45 (e.g., 0.47, 0.5). For example, in some cases, the ratio $W_{RT}/W_T$ of the total width $W_{RT}$ of the peripheral surfaces 75 of the wheels $28_1$-$28_{10}$ of a wheel-assembly over the width $W_T$ of the track 22 may be between 0.28 to 0.3, in some cases between 0.3 to 0.35, in some cases between 0.35 to 0.4, in some cases between 0.4 to 0.45 and in some cases even more than 0.45 (e.g., 0.47, 0.5 or more). This greater total width $W_{RT}$ of the wheels $28_i$, $28_j$ of the wheel-assembly may reduce wear of the track 22. For instance, the wheels $28_1$-$28_{10}$ may apply pressure over a greater area and thus reduce a stress subjected on the track 22.

For similar reasons, a width $W_D$ of a contact surface of the drive wheel 24 with the track 22 may also be increased. For instance, in some cases, a ratio $W_D/W_T$ of the width $W_D$ of the contact surface of the drive wheel 24 with the track 22 over the width $W_T$ of the track 22 may be at least 0.15, in some cases at least 0.17, in some cases at least 0.19, and in some cases even more (e.g., 0.20, 0.21, 0.22 or more). This greater width of the contact surface of the drive wheel 24 may reduce wear of the track 22. For instance, a contact surface between the teeth of the drive wheel 24 and the track 22 is wider. This enables the teeth of the drive wheel 24 to apply pressure on the track 22 over a greater area and thus reduce a stress subjected on the track 22 and its cores $44_1$-$44_N$.

Since the width $W_R$ of the peripheral surface 75 of the wheels $28_1$-$28_{10}$ in contact with the track 22 can be increased, in this embodiment, a length $L_C$ of a cores $44_i$ measured between the first and second longitudinal ends $48_1$, $48_2$ of the core $44_i$ may be made smaller since the transverse rigidity of the track 22 may not need to be as great owing to the improved lateral load distribution by the implementation of wheels $28_1$-$28_{10}$ with a wider peripheral surface 75. For instance, a ratio $L_C/W_T$ between the length $L_C$ of the core $44_i$ and the width $W_T$ of the track 22 may be no more than 0.85, in some cases no more than 0.75, in some cases no more than 0.65, in some cases between no more than 0.60 and in some cases even less than 0.60 (e.g., 0.58, 0.55). This can cause a reduction in a weight of the cores $44_i$ and consequently of the track 22 which may in turn improve a performance of the track system $16_i$.

The length $L_C$ of the core $44_i$ may be reduced by decreasing a length of the wings $50_1$, $50_2$ of the core $44_i$. In this embodiment, the core $44_i$ is symmetrical in the widthwise direction of the track 22 about a centerline 23 of the core $44_i$ such that each wing $50_1$, $50_2$ has a same length $L_W$. In some cases, a ratio $L_W/L_C$ of the length $L_W$ of the wings $50_1$, $50_2$ over the length $L_C$ of the core $44_i$ may be no more than 0.30, in some cases no more than 0.27, in some cases no more than 0.25, in some cases no more than 0.22, in some cases no more than 0.20 and in some cases even less than 0.20 (e.g., 0.19, 0.18).

Figure 8:
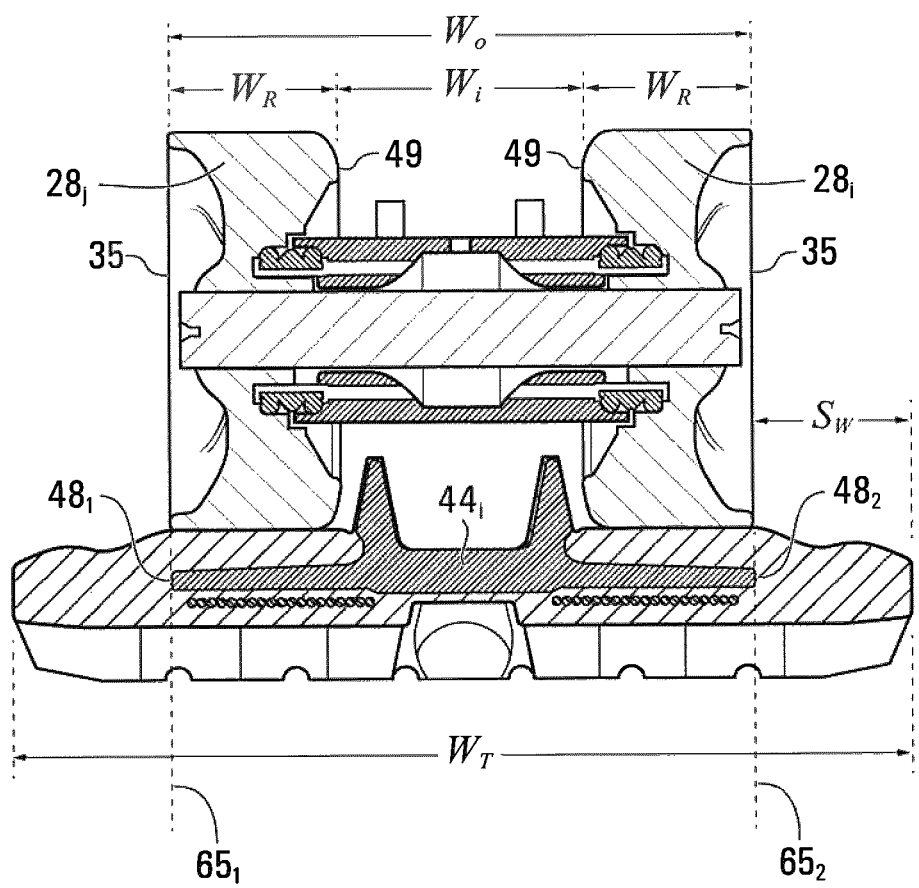
FIG. 8 shows another cross-sectional view of a portion of the track system.
Figure 9:
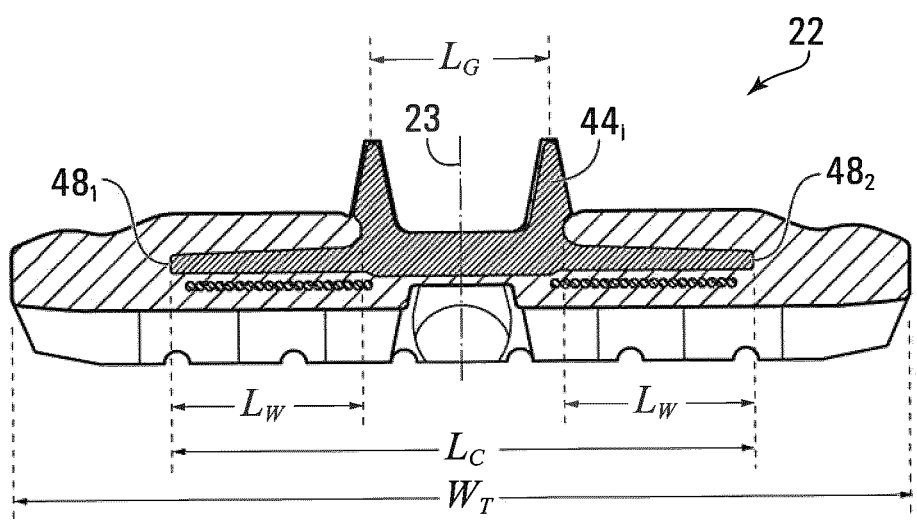
FIG. 9 shows a cross-sectional view of the track.

More particularly, in this embodiment, as shown in FIG. 8, the longitudinal ends $48_1$, $48_2$ of the cores $44_1$-$44_N$ do not extend beyond the respective outer lateral edge 35 of each of the wheels $28_i$, $28_j$ of a wheel-assembly in the widthwise direction of the track system $16_i$. In this example, the longitudinal ends $48_1$, $48_2$ of the cores $44_1$-$44_N$ are generally aligned (i.e., coplanar) with the respective outer lateral edge 35 of each of the wheels $28_i$, $28_j$ of a wheel-assembly in the widthwise direction of the track system $16_i$. For instance, a plane $65_1$ normal to the widthwise direction of the track system $16_i$ and coincident with the first longitudinal end $48_1$ of a core $44_i$ is also generally coincident with the outer lateral edge 35 of a wheel $28_j$ of a wheel-assembly, while simultaneously, a plane $65_2$ normal to the to the widthwise direction of the track system $16_i$ and coincident with the second longitudinal end $48_2$ of the core $44_i$ is also generally coincident with the outer lateral edge 35 of a wheel $28_i$ of the wheel-assembly.

In some embodiments, the track system $16_i$ may be designed such that the outer lateral edges 35 of the wheels $28_i$, $28_j$ of a wheel-assembly extend in a widthwise direction of the track system $16_i$ beyond the first and second longitudinal ends $48_1$, $48_2$ of the cores $44_1$-$44_N$. For example, the distance $W_o$ measured between outer lateral edges 35 of the wheels $28_i$, $28_j$ of a wheel-assembly may be greater than the length $L_C$ between the first and second longitudinal ends $48_1$, $48_2$ of the cores $44_1$-$44_N$. This may help reduce upward flexing of the track 22 when a lateral end portion of the track 22 travels over and/or impacts an obstacle and may thus generally reduce wear of the track 22. For instance, such flexing of the track 22 can cause a portion 51 of the elastomeric material 38 of the track 22 between the lateral edge $31_1$ and the cores $44_1$-$44_N$ to be more susceptible to tearing.

Furthermore, a distance $L_G$ between the guide projections $56_1$, $56_2$ of the wheel guide 52 may be increased since the wheel guide 52, much like the wheels $28_1$-$28_{10}$, is not restricted laterally by the frame 42 of the track system $16_i$. For instance, in some embodiments, a ratio $L_G/W_T$ of the distance $L_G$ measured between the guide projections $56_1$, $56_2$ of the wheel guide 52 over the width $W_T$ of the track 22 may be at least 0.19, in some cases at least 0.22, in some cases at least 0.25, in some cases at least 0.27, and in some cases even more (e.g., 0.30, 0.31 or more).

A distance $S_W$ measured between a lateral edge $31_i$ of the track 22 and an adjacent outer lateral edge of a wheel $28_i$ of a wheel-assembly may thus be decreased. For instance, a ratio $S_W/W_T$ of a distance $S_W$ measured between a lateral edge $31_i$ of the track 22 and an adjacent outer lateral edge of a wheel $28_i$ of a wheel-assembly over the width $W_T$ of the track 22 may be no more than 0.19, in some cases no more than 0.15, in some cases no more than 0.10, in some cases no more than 0.05, and in some cases even less (e.g., 0.04 or less).

II. Ease of Installation of the Track System and Enhanced Suspension

In some embodiments, the track system $16_i$ may be designed to facilitate the mounting of the track system $16_i$ onto the vehicle 10 and to enhance a suspension of the track system $16_i$.

Figure 3:
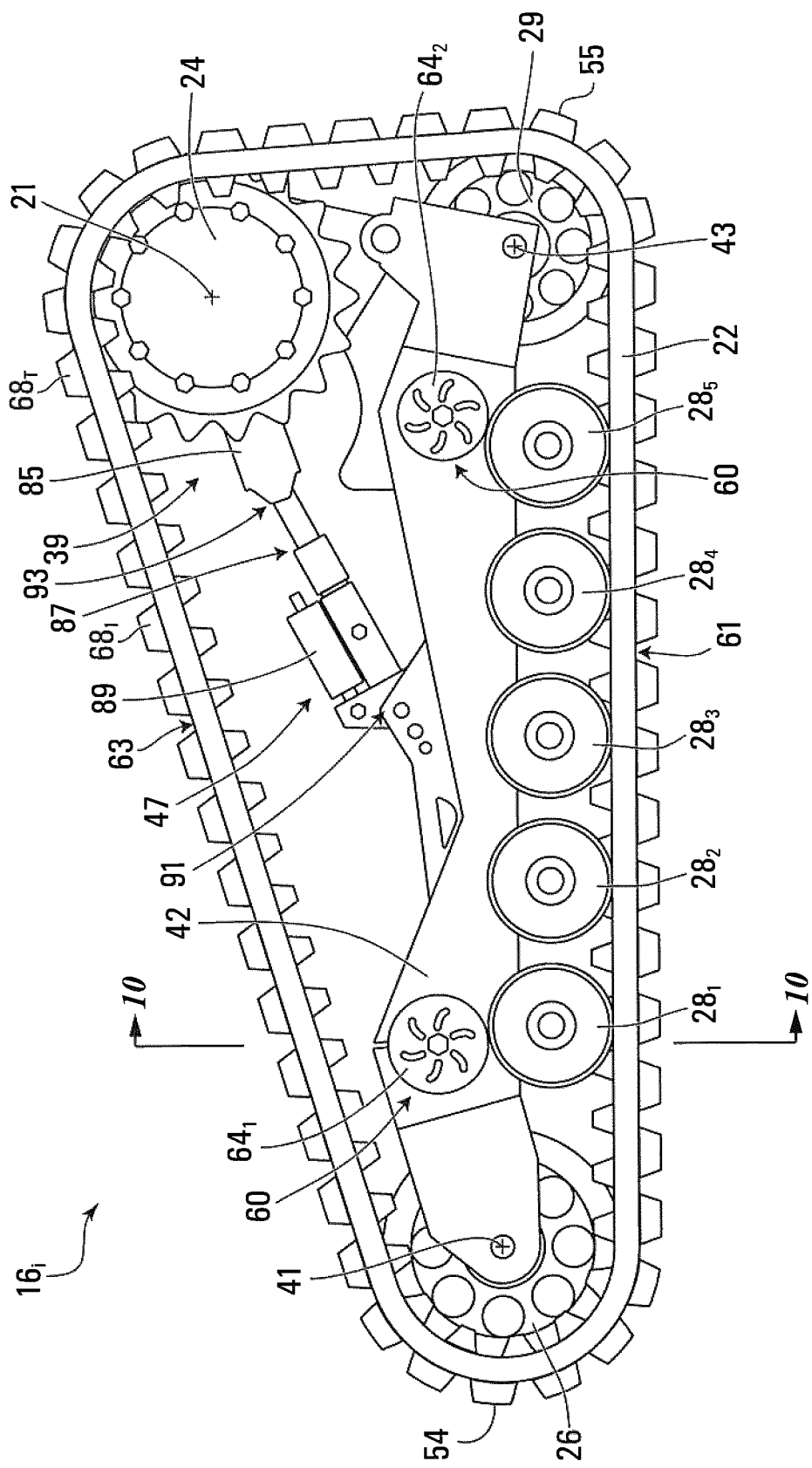
FIG. 3 shows a side view of the track system.
Figure 4:
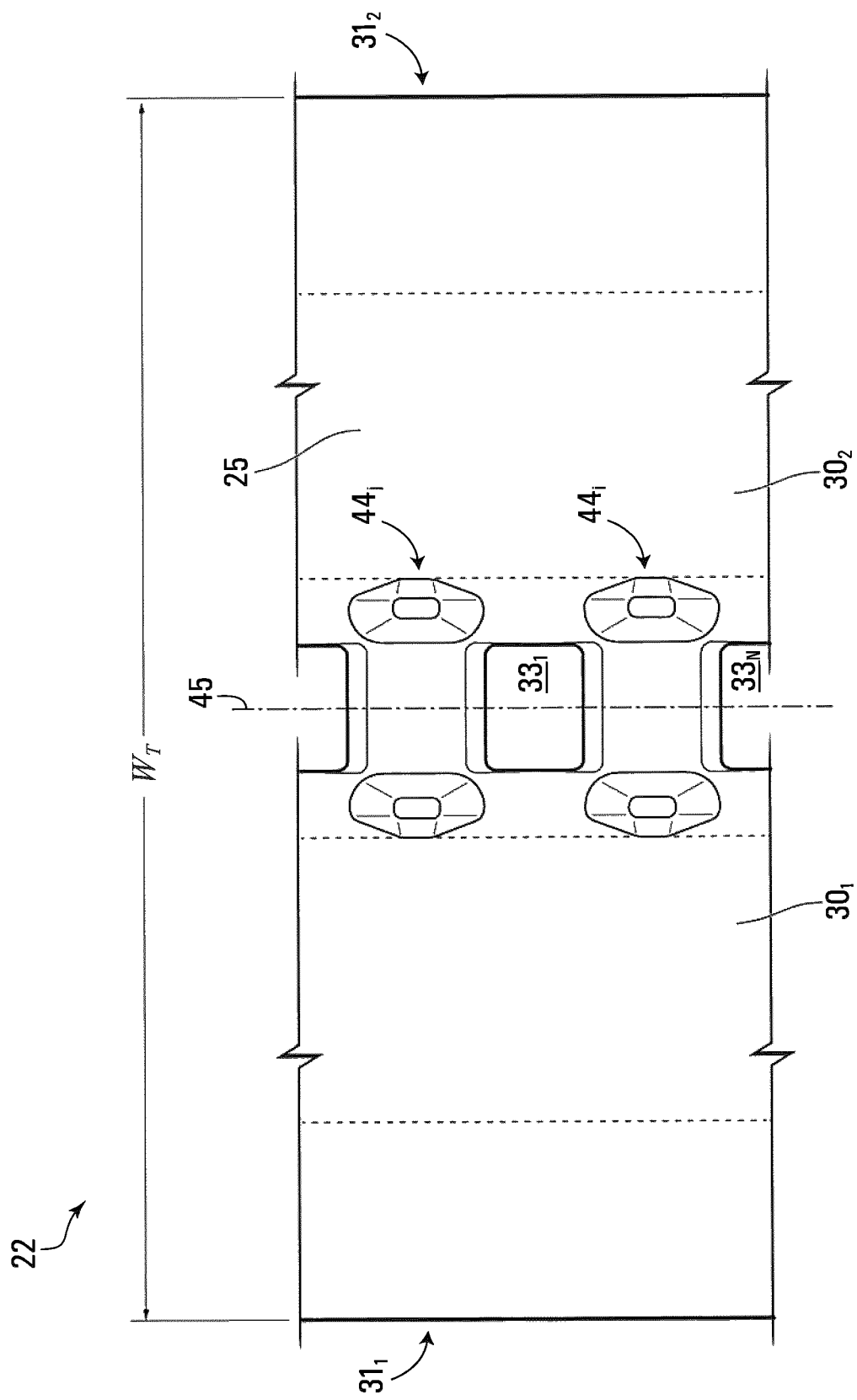
FIGS. 4 and 5 respectively show an inside top view and a cross-sectional view of a track of the track system.
Figure 5:
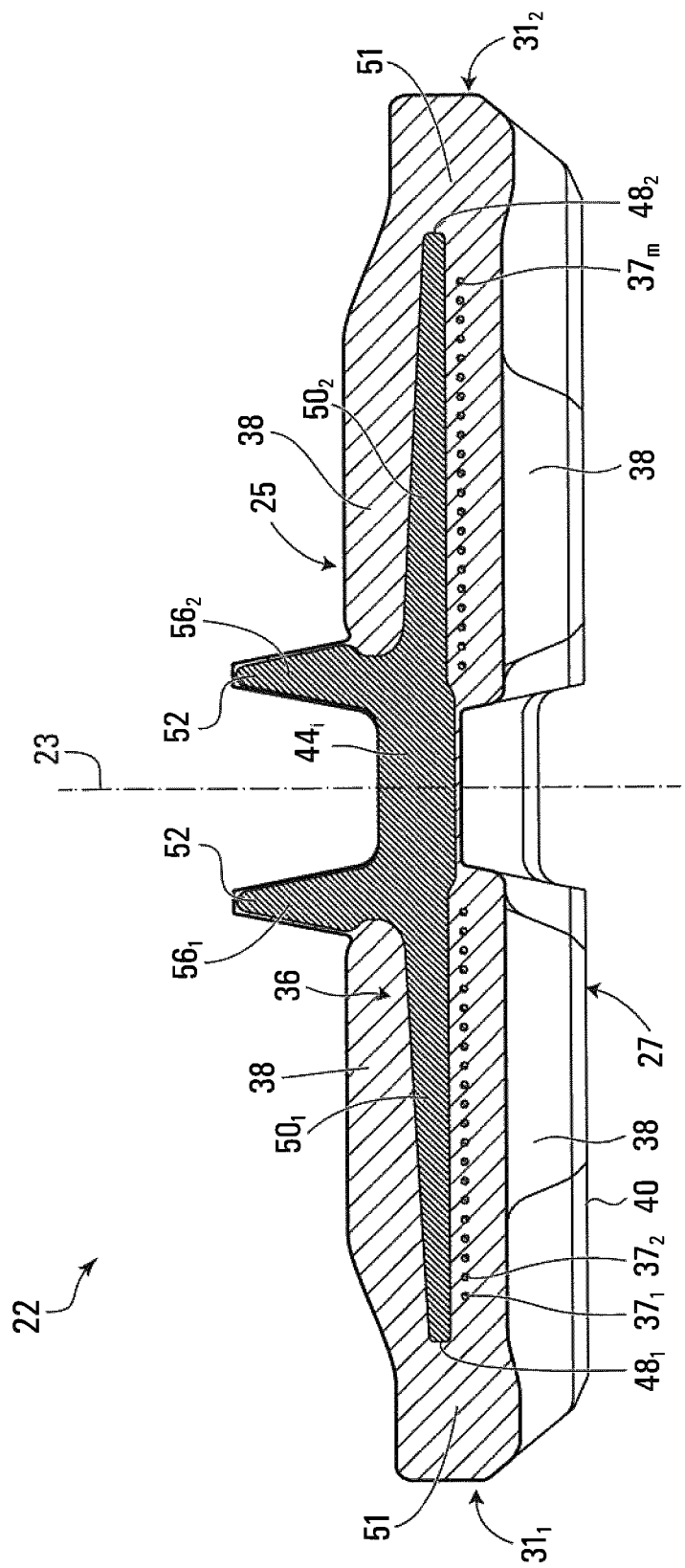
Figure 10:
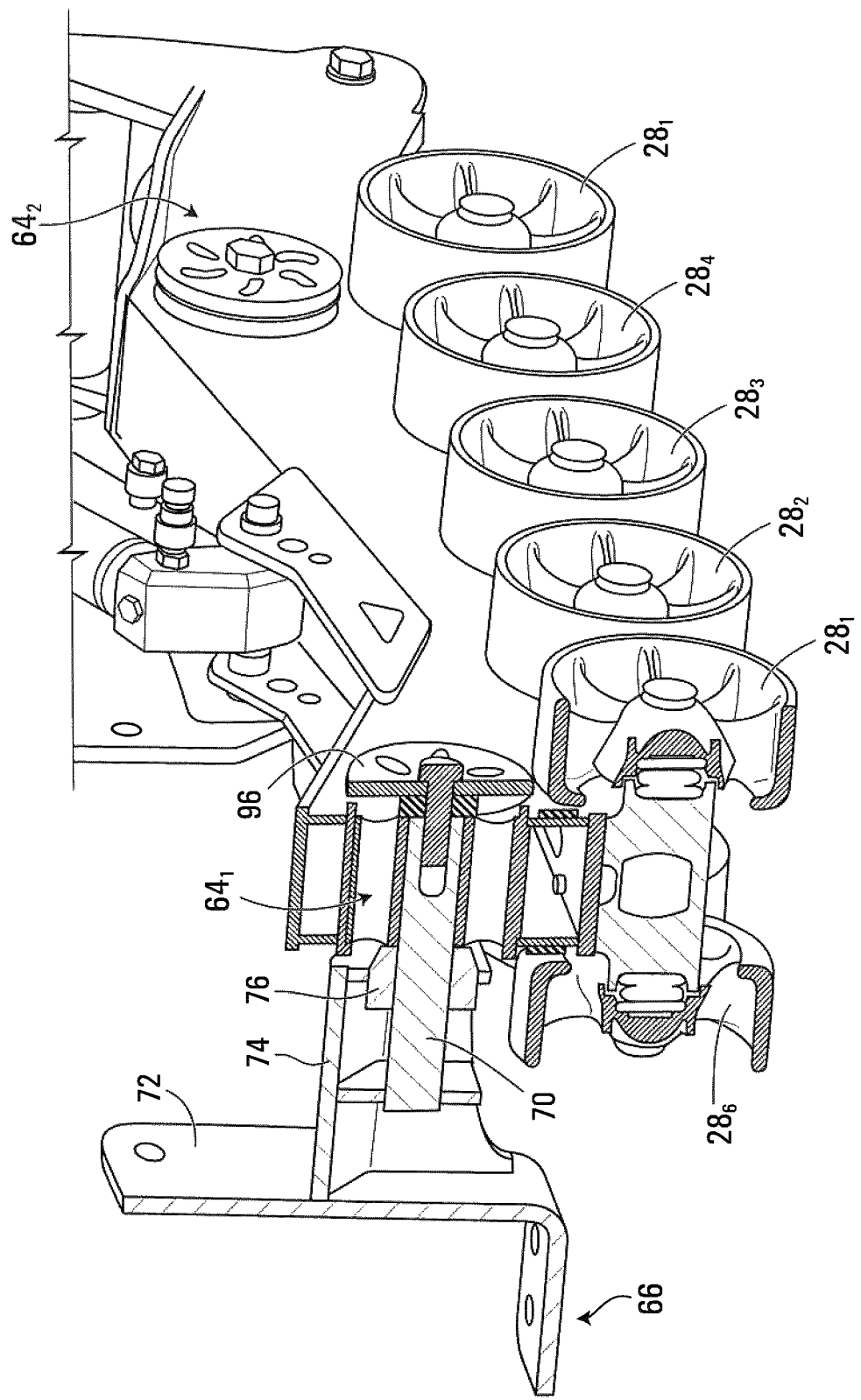
FIG. 10 shows an isometric sectional view of the track system taken along line 10-10 of FIG. 2.

For example, in some embodiments, as shown in FIGS. 3 and 10, the track system $16_i$ comprises a mounting arrangement 60 for mounting the track system $16_i$ to the vehicle 10. As will be described further below, in this embodiment, the mounting arrangement 60 also implements a "suspension" of the track system $16_i$ and may thus be referred to as a suspension of the track system $16_i$. In this example, the mounting arrangement 60 comprises a pair of mounts $64_1$, $64_2$ connected to the frame 42 of the track system $16_i$, each mount $64_i$ being configured to interact with a support 66. The mounting arrangement 60 may comprise a single mount or more than two mounts in other embodiments (e.g., three, four or more mounts).

The support 66 is configured to establish a connection between the track system $16_i$ and the frame 12 of the vehicle 10. In this embodiment, the support 66 is provided as part of the frame 12 of the vehicle 10. That is, a manufacturer of the vehicle 10 provides the support 66 as a standard part of the frame 12 of the vehicle 10. In other embodiments, the support 66 may instead be provided with the track system $16_i$ such that the support 66 is first installed onto the frame 12 of the vehicle 10 in order to install the track system $16_i$.

Figure 11:
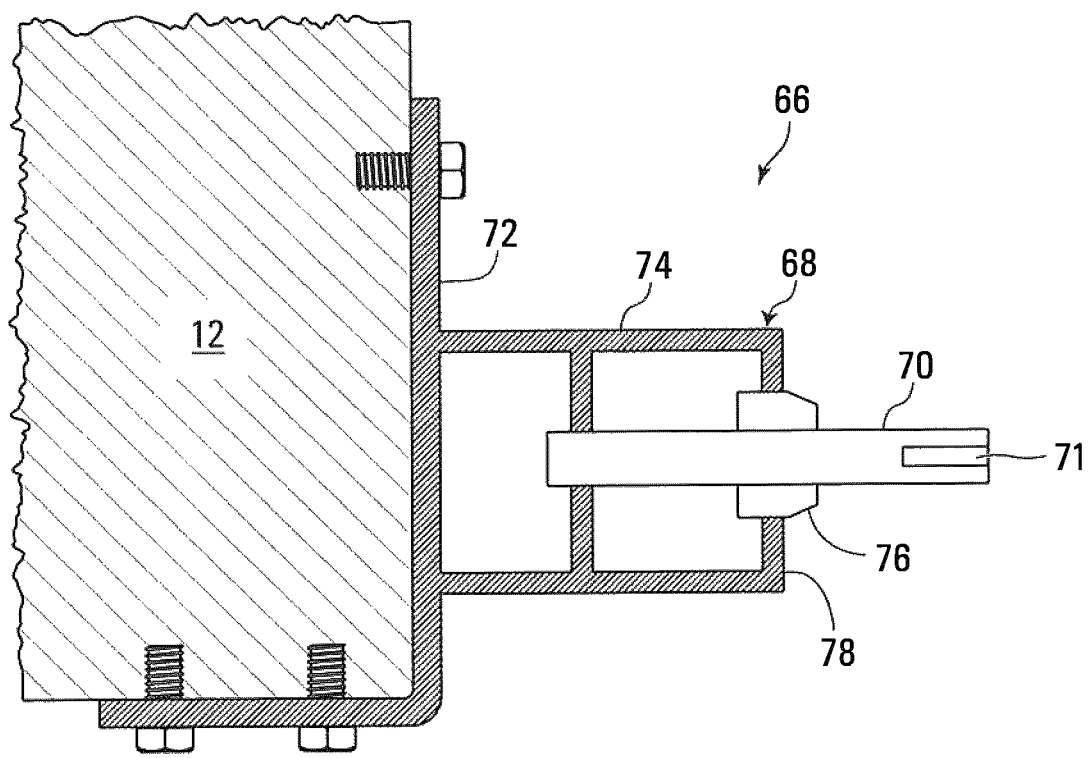
FIG. 11 shows a cross sectional view of a support installed on the work vehicle.

With additional reference to FIG. 11, the support 66 comprises a base 68 and a support arm 70. In this embodiment, the base 68 comprises a bracket portion 72 and a projected portion 74. The bracket portion 72 is configured to be fastened to the frame 12 of the vehicle 10 in any suitable way (e.g., bolts, welding, etc.) while the projected portion 74 is configured to receive the support arm 70. For instance, the projected portion 74 may comprise an opening in which the support arm 70 is received via a bushing 76. The support arm 70 comprises a fastening element 71 for mating with a complementary fastening element. In this embodiment, the fastening element 71 comprises a threaded hole.

In other embodiments, the support 66 may be made as a single component. For example, the base 68 and the support arm 70 may be manufactured (e.g., cast) as a single component.

Figure 12:
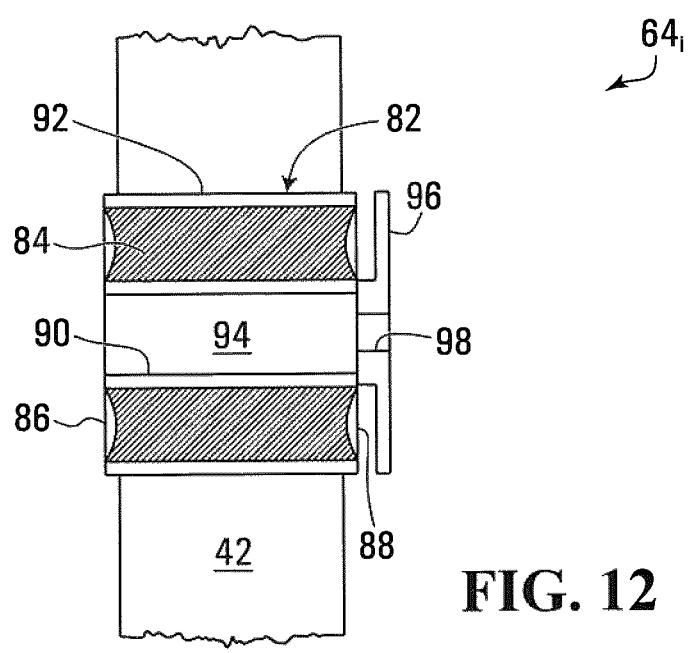
FIG. 12 shows a resilient mount of a mounting arrangement of the track system.
Figure 13:
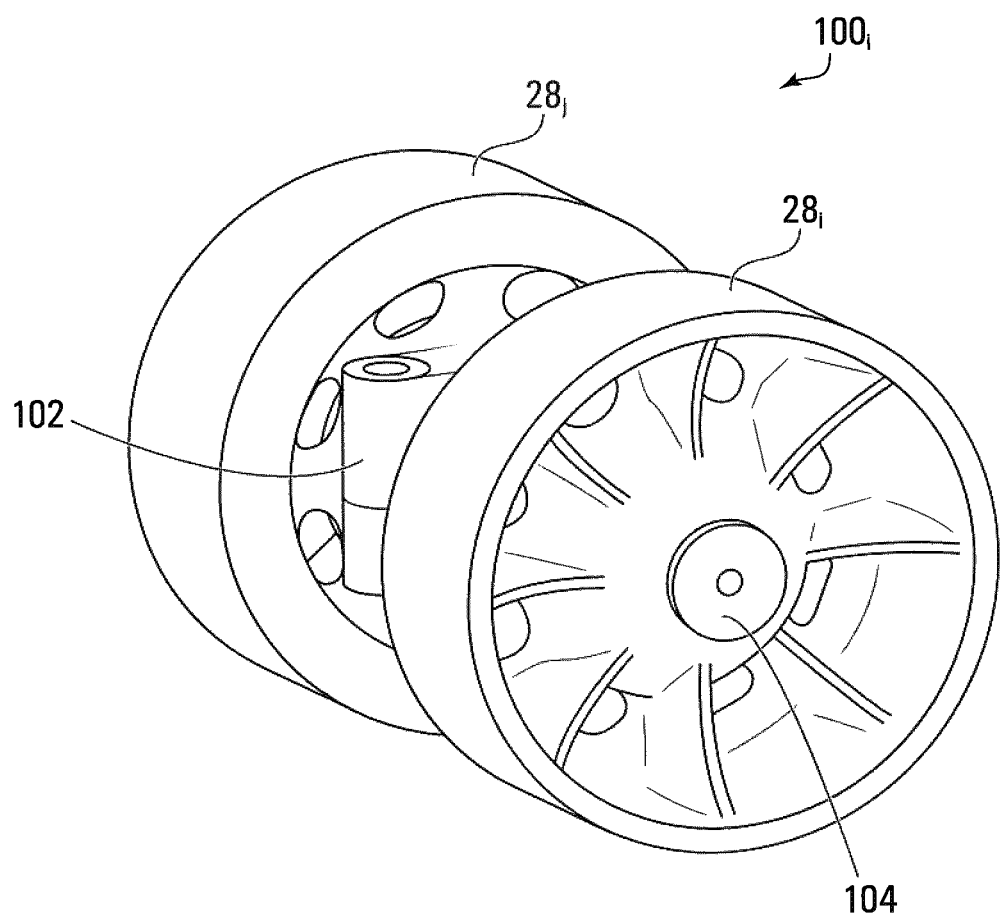
FIG. 13 shows a perspective view of a wheel assembly of the track system.
Figure 14:
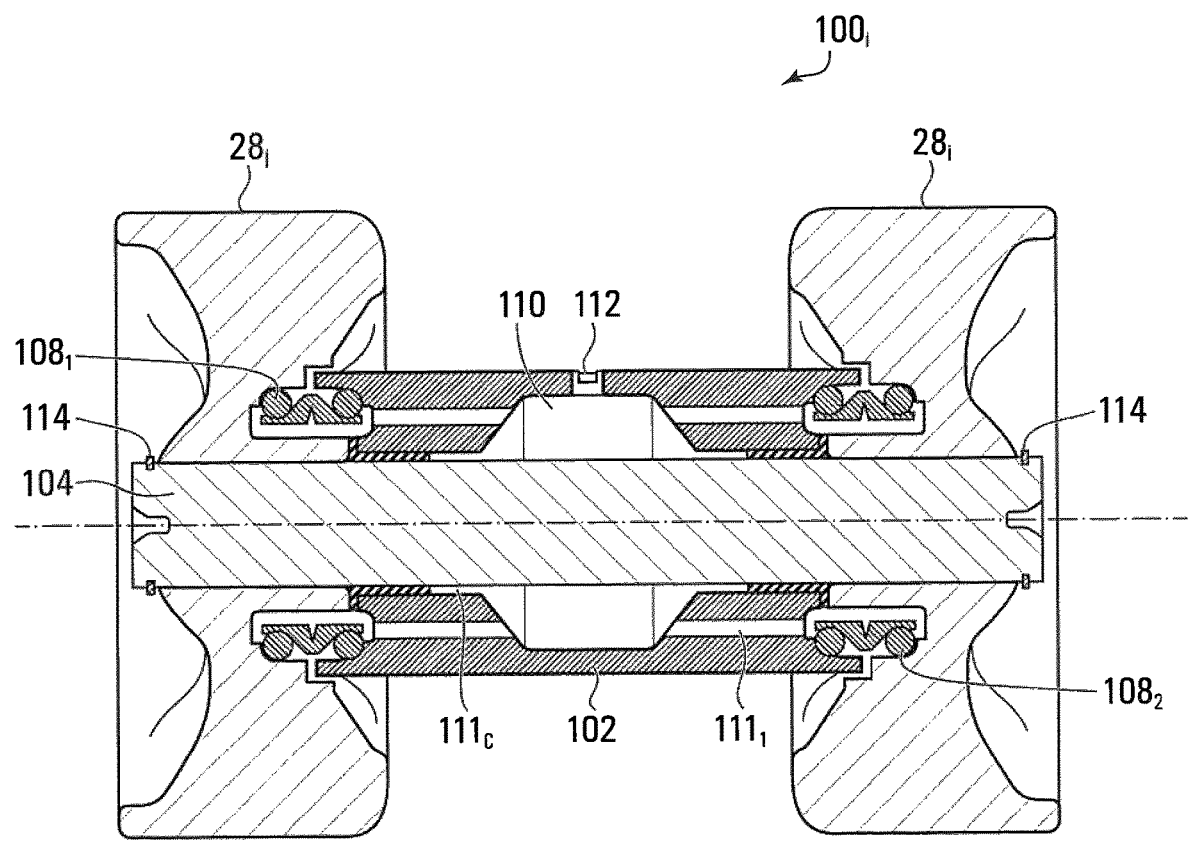
FIG. 14 shows a cross-sectional view of the wheel assembly.

Each mount $64_i$ of the mounting arrangement 60 is configured to engage a corresponding support 66. Moreover, in this embodiment, as will be elaborated further below, each mount $64_i$ is resilient to at least partially absorb impacts or other vibrations within the track system $16_i$. As shown in FIG. 12, the mount $64_i$ comprises a housing 82 and a resilient material 84 for providing compliance to the mount $64_i$. The housing 82 extends in the widthwise direction of the track system $16_i$ from a first end 86 to a second end 88 and comprises inner and outer walls 90, 92. The resilient material 84 is at least partially contained within the housing 82 and has a shape similar to the housing 82 (i.e. a cylindrical shape).

In this embodiment, the mount $64_i$ is configured to slidably engage the support arm 70 of the support 66. For instance, a diameter of the inner wall 86 of the housing 82 may be dimensioned such that the mount $64_i$ can slidably engage the support arm 70. The sliding engagement of the mount $64_i$ on the support arm 70 is stopped by an abutment of the first end 86 of the housing 82 with an outer surface 78 of the of the base 68 of the support 66.

The mount $64_i$ further comprises a locking member 96 for securing the mount in engagement with the support 66. The locking member 96 is disposed on an outboard side of the track system $16_i$ (i.e., a side of the track system $16_i$ that faces away from the vehicle 10) and comprises an opening 98 for receiving a fastener (e.g., a bolt). More particularly, as shown in FIG. 11, a fastener is inserted into the opening 98 and engages the fastening element 71 (i.e., the threaded hole) of the support arm 70 such as to secure the mount $64_i$ to the support 66.

In some embodiments, the mounting arrangement 60 of the track system $16_i$ may be configured to compensate for and/or otherwise adapt to a misalignment at a connection between the track system $16_i$ and the vehicle 10. For instance, the track system $16_i$ may be configured to compensate for and/or otherwise adapt to a camber (i.e., a camber angle), that is implemented at the connection between the track system $16_i$ and the vehicle 10. The track system $16_i$ may be configured to compensate for and/or otherwise adapt to the misalignment to enhance its traction and/or other aspects of its performance and/or use.

To this end, in this embodiment, the mount $64_i$ is a "resilient" mount $64_i$ that is deformable (i.e., changeable in configuration). More particularly, the mount $64_i$ is operable to deform from a first configuration to a second configuration in response to a load and recover the first configuration in response to removal of the load. As mentioned above, the resilient material 84 of the mount $64_i$ provides compliance to the mount $64_i$. Although, the resilient material 84 of the mount $64_i$ is shaped cylindrically in this embodiment, the resilient material 84 may be shaped in any suitable way in other embodiments. For instance, in some embodiments, the resilient material 84 may be rectangular (e.g., a pad) or may have a V-shape.

More specifically, the resilient material 84 of the mount $64_i$ is more flexible and/or softer than a material of the housing 82.

For example, in some embodiments, a ratio of a modulus of elasticity of the resilient material 84 over a modulus of elasticity of the material of the housing 82 may be no more than 0.3, in some cases no more than 0.2, in some cases no more than 0.1, in some cases no more than 0.05, and in some cases even less. This ratio may have any other suitable value in other embodiments. For instance, in some embodiments, the modulus of elasticity of the resilient material 84 may be no more than 0.4 GPa, in some cases no more than 0.2 GPa, in some cases no more than 0.05 GPa, and in some cases even less.

The modulus of elasticity of the resilient material 84 may have any other suitable value in other embodiments.

As another example, in some embodiments, a ratio of a hardness of the resilient material 84 over a hardness of the material of the housing 82 may be no more than 0.5, in some cases no more than 0.4, in some cases no more than 0.3, in some cases no more than 0.2, in some cases no more than 0.1, and in some cases even less. This ratio may have any other suitable value in other embodiments. For instance, in some embodiments, the hardness of the resilient material 84 may be no more than 50 Shore D in some cases no more than 20 Shore D in some cases no more than 1 Shore D (60 Shore A) and in some cases even less. The hardness of the resilient material 84 may have any other suitable value in other embodiments.

In this embodiment, the resilient material 84 is elastomeric material. More particularly, in this embodiment, the elastomeric material 84 comprises rubber. The elastomeric material 84 may comprise any other suitable elastomer (e.g., ethylene-vinyl acetate (EVA), polyurethane) in other embodiments. The resilient material 84 may be any other suitable material providing suitable compliance in other embodiments (e.g., a gel or other fluid).

Figure 23:
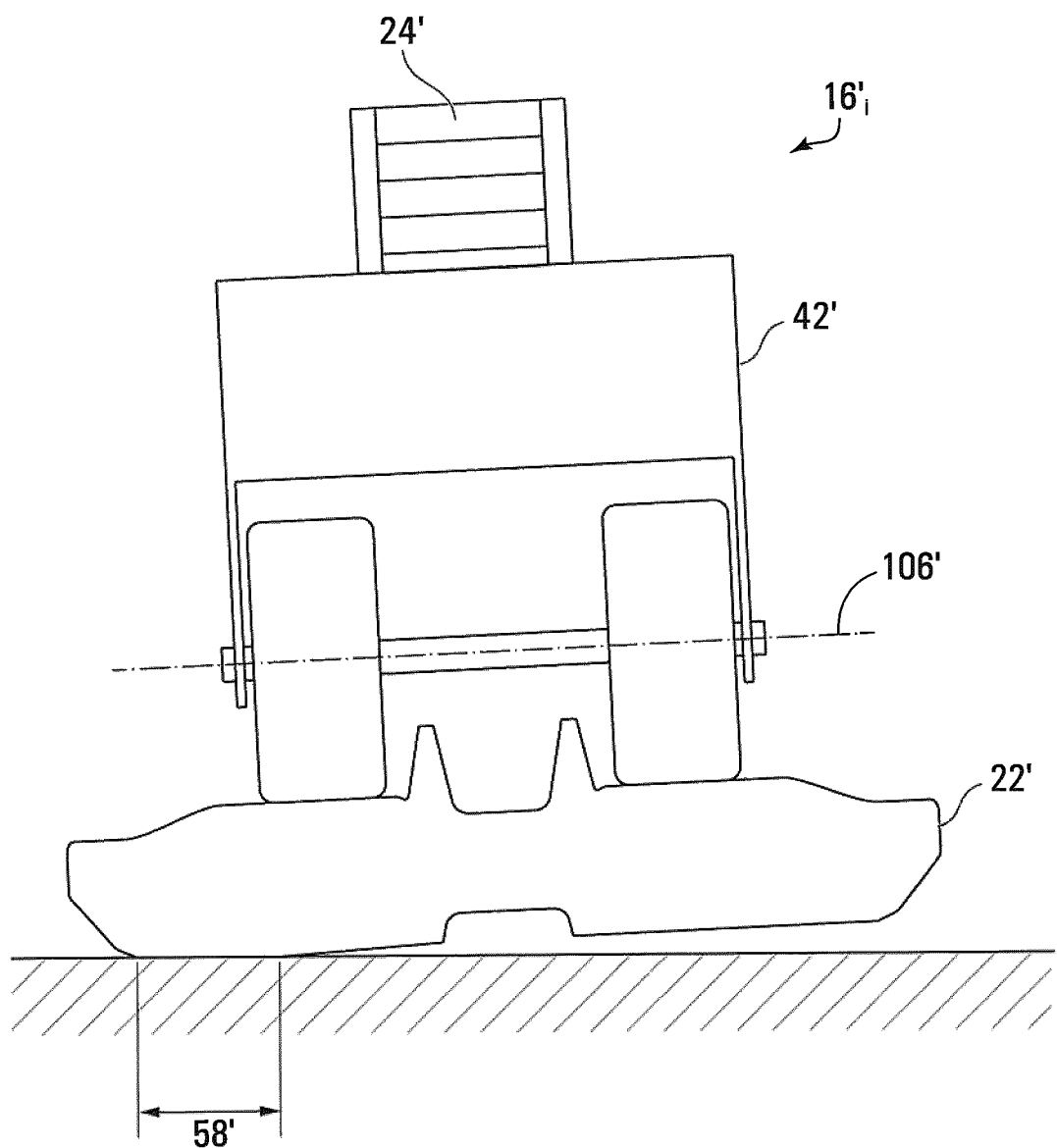
FIG. 23 show a prior art track system in which a camber is implemented and uncompensated.
Figure 24:
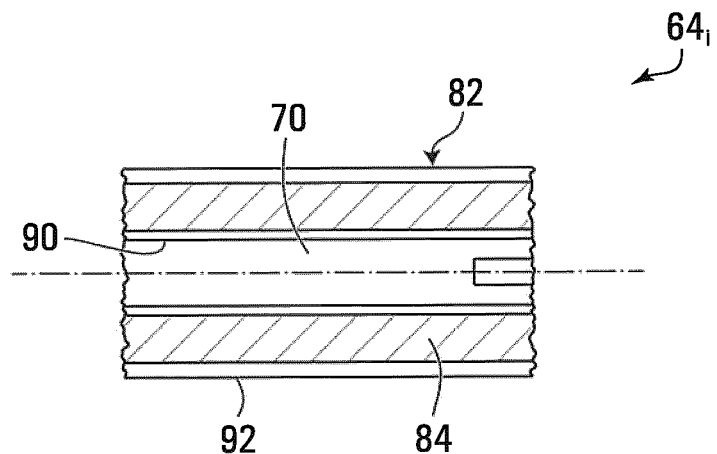
FIG. 24 shows a cross-sectional view of the resilient mount of the mounting arrangement in a first configuration when there is no camber angle implemented.
Figure 25:
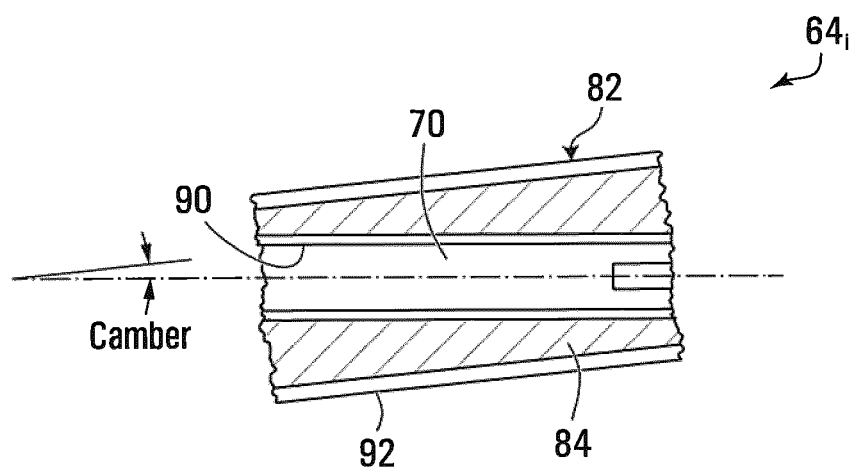
FIG. 25 shows a cross-sectional view of the resilient mount of the mounting arrangement in a second configuration when there is a camber angle implemented.

In some cases, as shown in FIG. 23, this may address issues with a conventional track system $16_i'$ in which the camber implemented at the connection between the vehicle and the track system $16_i'$ results in uneven contact of its track 22' with the ground due to only certain ones of its wheels $28_1'$-$28_{10}'$ bearing some load while other ones of its wheels $28_1'$-$28_{10}'$ are off the ground and unloaded, thereby causing the track's contact patch 58' to extend over a very limited part of the track's width. Such a scenario may also cause uneven wear of the track 22' as the wheels $28_1'$-$28_{10}'$ and apply more pressure on one side of the track 22' than the other which can result in severe wear on one side of the track 22'.

Figure 26:
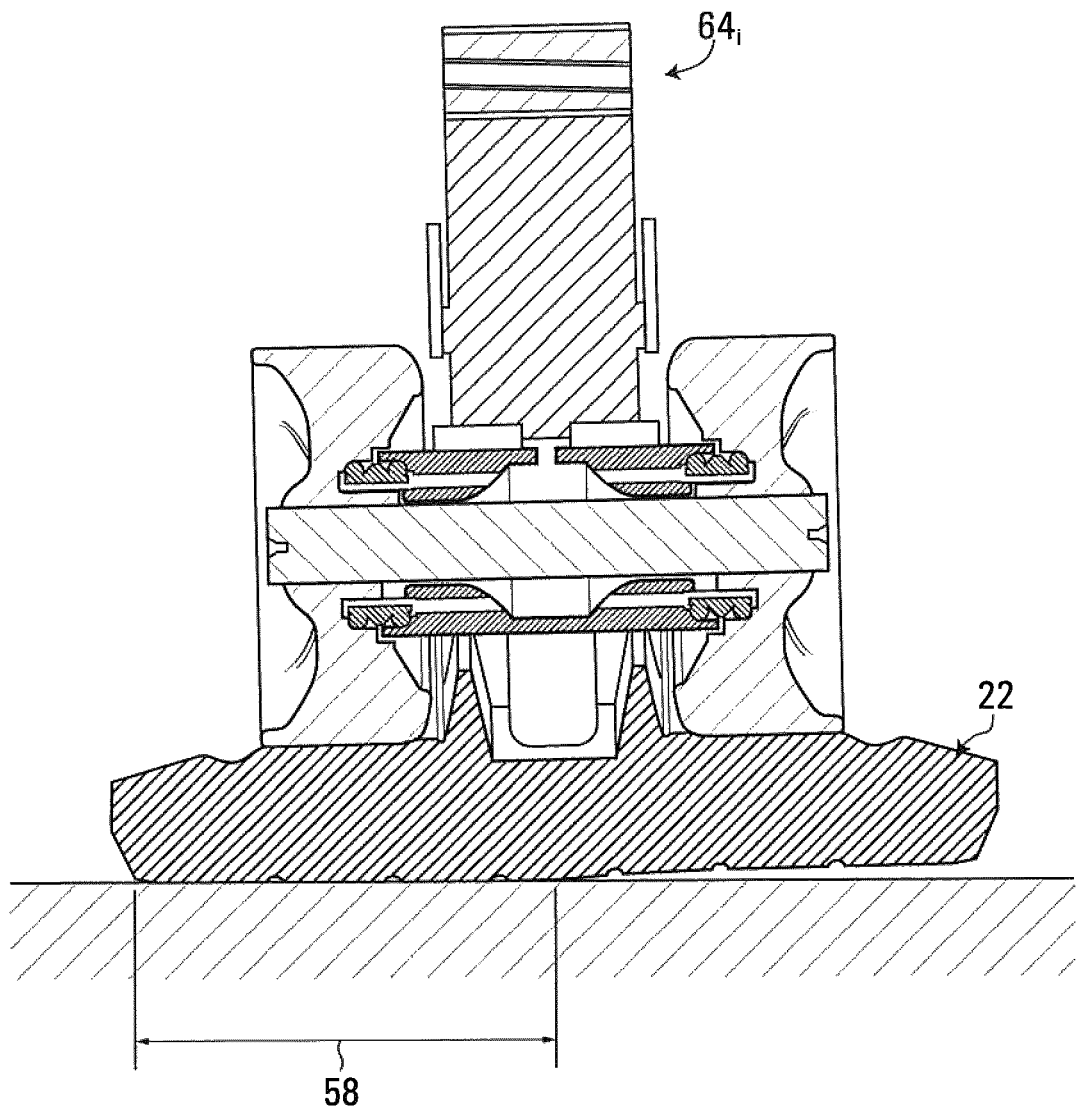
FIG. 26 shows the track system compensating for a camber via the mounting arrangement.

As shown in FIG. 26, the mount $64_i$ of the mounting arrangement 60 is configured such that, even with the camber implemented, when the ground is horizontal, a contact patch 58 of the track 22 with the ground extends over at least a substantial part of the width of the track 22 (i.e., over all or a substantial part of the width $W_T$ of the track 22). That is, in some embodiments, the mount $64_i$ may be configured such that, even with the camber implemented, when the ground is horizontal, the contact patch 58 of the track 22 with the ground may extend over at least 30%, in some cases at least 40%, in some cases at least 50%, in some cases at least 60%, in some cases at least 70%, in some cases at least 80%, in some cases at least 90% and in some cases even more of the width of the track 22. Thus, in some examples of implementation, the mount $64_i$ may be configured such that, even with the camber implemented, when the ground is horizontal, the contact patch 58 of the track 22 with the ground extends over at least a majority of the width $W_T$ of the track 22, and in some cases all or nearly all of the width $W_T$ of the track 22.

The mounting arrangement 60 may be configured in various other ways in other embodiments.

III. Modularity and Reduced Complexity of the Wheel Assemblies

In some embodiments, certain ones of the wheels $28_1$-$28_{10}$ of the track system $16_i$ may be grouped together to form modular subassemblies of the track system $16_i$. This may help to reduce an amount of components involved in manufacturing the wheels $28_1$-$28_{10}$ and consequently to reduce production costs of the track system $16_i$.

For example, in some embodiments, with additional reference to FIGS. 2 and 13 to 16, the track system $16_i$ may comprise a plurality of wheel assemblies $100_1$-$100_5$. Each wheel assembly $100_i$ comprises two wheels $28_i$, $28_j$ that are laterally-adjacent (i.e., mounted transversally and rolling about a common axis), a housing 102 for securing the wheel assembly $100_i$ to the frame 42 of the track system $16_i$, and a shaft 104 defining an axle of the two wheels $28_i$, $28_j$.

The shaft 104 extends within the housing 102 and is journaled in the housing 102. To this end, bushings $108_1$, $108_2$ are disposed at a contact interface between the shaft 104 and the housing 102 to seal the clearance between the housing 102 and the shaft 104. In some embodiments, the bushings $108_1$, $108_2$ may instead be substituted by bearings (for high speed applications for example).

The housing 102 comprises a lubricant reservoir 110 configured for lubricating the contact interface between the shaft 104 and the housing 102 as well as the bushings $108_1$, $108_2$. To this end, the housing 102 comprises a plurality of passageways $111_1$-$111_C$ that interconnect the lubricant reservoir 110 to the contact interface between the shaft 104 and the housing 102. The plurality of conduits $111_1$-$111_C$ also interconnects the lubricant reservoir 110 to the bushings $108_1$, $108_2$. A sealable opening 112 of the housing 102 provides access to the lubricant reservoir 110 such that the user may fill the lubricant reservoir 110 with an appropriate lubricant (e.g., oil).

The wheels $28_i$, $28_j$ are mounted to the shaft 104 such that the wheels $28_i$, $28_j$ are rotatable together with the shaft 104 about an axis of rotation 106. In other words, an angular rotation of the shaft 104 causes an identical angular rotation of the wheels $28_i$, $28_j$. For instance, in this embodiment, the wheels $28_i$, $28_j$ are mounted to the shaft 104 via a press-fit. Alternatively, the wheels $28_i$, $28_j$ may be mounted to the shaft 104 in any other suitable way. In addition, in this embodiment, a retaining ring 114, such as a C-clip, is disposed at each end portion of the shaft 104 to prevent the wheels $28_i$, $28_j$ from being disengaged from the shaft 104. The shaft 104 may comprise a groove for holding captive the retaining ring 114 therein.

Figure 15:
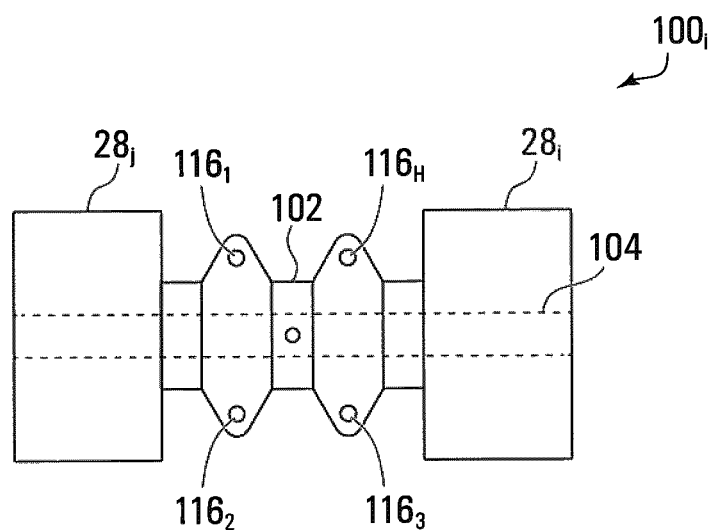
FIG. 15 shows a top view of the wheel assembly.
Figure 16:
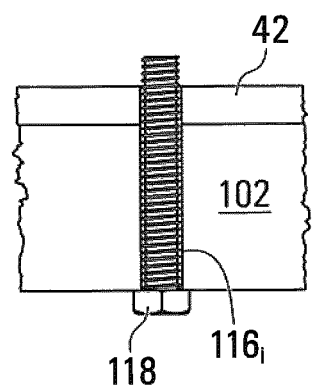
FIG. 16 shows a connection between the wheel assembly and a frame of the track system.

The wheel assembly $100_i$ is secured to the frame 42 of the track system $16_i$ via the housing 102. As shown in FIGS. 15 and 16, the housing 102 comprises a plurality of holes $116_1$-$116_H$ formed on mounting pads for receiving a fastener 118 therein. For example, the fastener 118 may traverse a hole $116_i$ and securely engage the frame 42 of the track system $16_i$ via a threaded feature of the frame 42.

The wheel assembly $100_i$ may be configured in various other ways, as described below.

Figure 17:
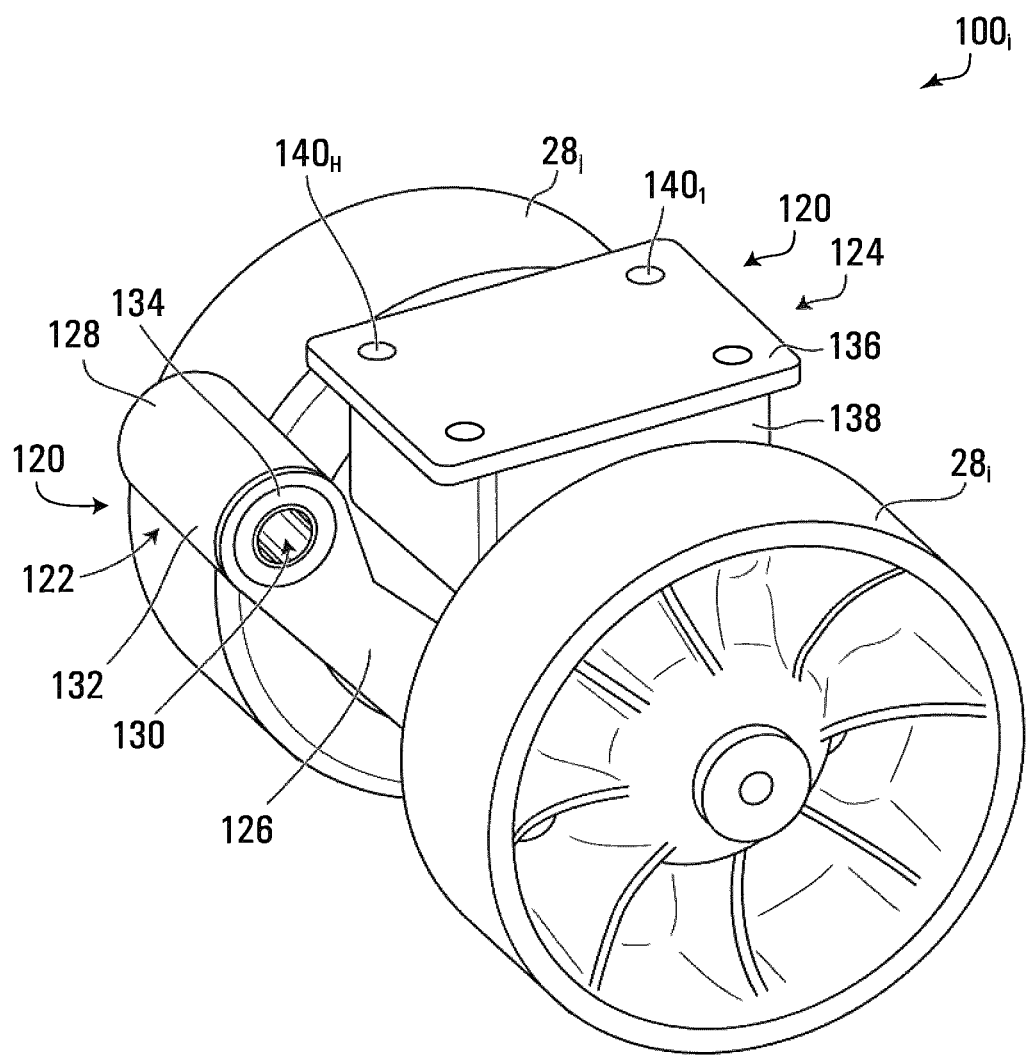
FIG. 17 shows another embodiment of the wheel assembly in which the wheel assembly comprises a suspension.
Figure 18:
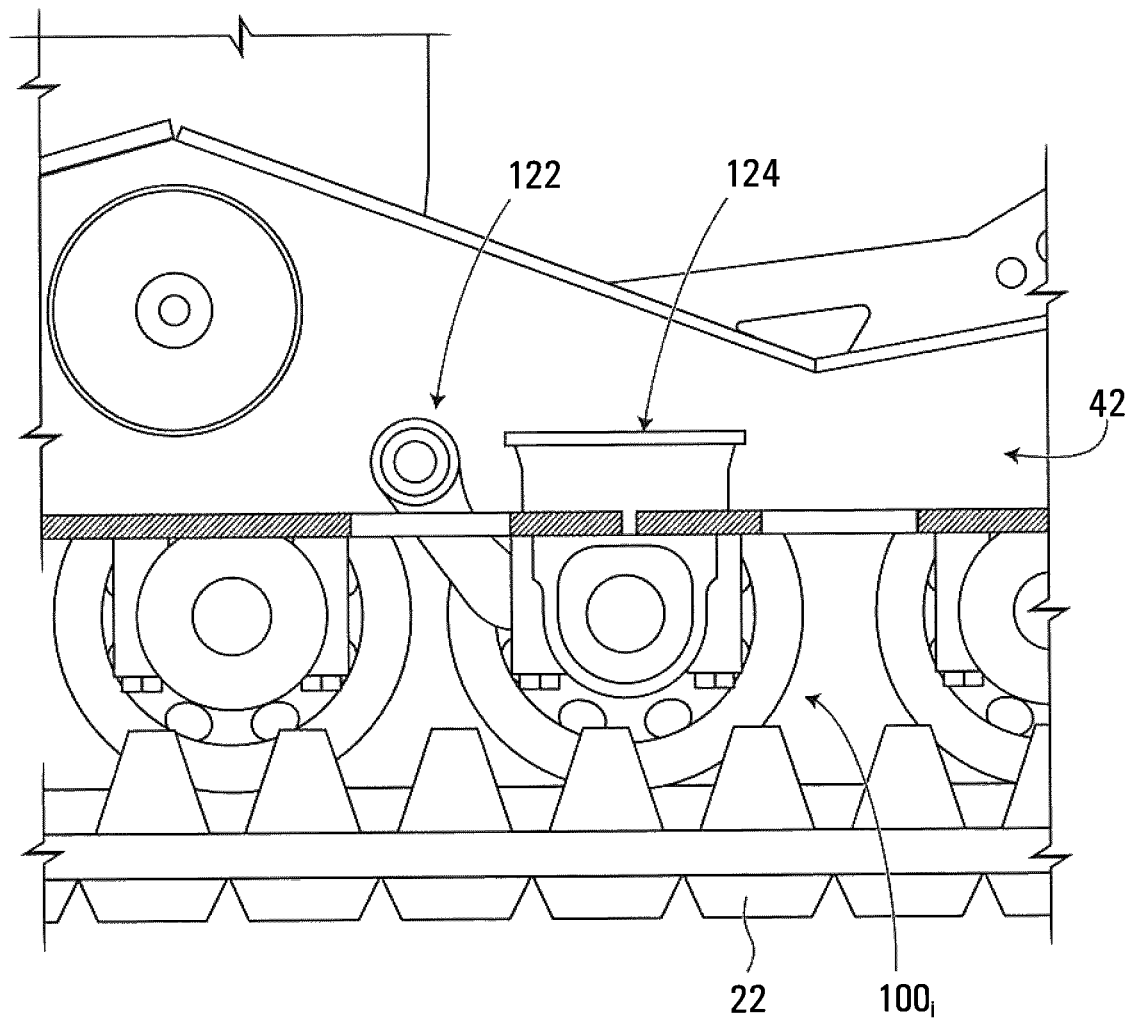
FIG. 18 shows the wheel assembly of FIG. 17 installed on the track system.

For instance, with additional reference to FIG. 17, in some embodiments, the wheel assembly $100_i$ may comprise a suspension 120 for absorbing impacts undergone by the wheel assembly $100_i$.

In this embodiment, the suspension 120 comprises first and second suspension members 122, 124. The first suspension member 122 comprises an arm structure 126 protruding upwardly from the housing 102 of the wheel assembly $100_i$. An end portion 128 of the arm structure 126 is shaped cylindrically and extends in a widthwise direction of the wheel assembly $100_i$ (i.e., in a direction generally parallel to the axis of rotation 106 of the shaft 104). A mount 130 is provided at the end portion 128 of the arm structure 126 and is configured to engage a support shaft of the track system $16_i$ (not shown). The mount 130 is configured to at least partially absorb impacts and/or other vibrations at the wheel assembly $100_i$. To this end, in this embodiment, the mount 130 is a "resilient" mount 130 that is deformable (i.e., changeable in configuration). More particularly, the mount 130 is operable to deform from a first configuration to a second configuration in response to a load and recover the first configuration in response to removal of the load. In this embodiment, the mount 130 comprises a housing 132 and a resilient material 134 for providing compliance to the mount 130. The resilient material 134 is at least partially contained within the housing 132.

In this embodiment, the resilient material 134 is elastomeric material, such as rubber. The elastomeric material 134 may comprise any other suitable elastomer (e.g., ethylene-vinyl acetate (EVA), polyurethane) in other embodiments. The resilient material 134 may be any other suitable material providing suitable compliance in other embodiments (e.g., a gel or other fluid).

The second suspension member 124 comprises a support plate 136 and a resilient pad 138. More specifically, the support plate 136 is secured to the resilient pad 138 while the resilient pad 138 is fixed to the housing 102 of the wheel assembly $100_i$ in any suitable way (e.g., fasteners, adhesives, etc.). The support plate 136 comprises a plurality of holes $140_1$-$140_H$ for receiving a fastener therein to secure the wheel assembly $100_i$ to the frame 42 of the track system $16_i$.

In this embodiment, the resilient pad 138 comprises resilient material similar to the resilient material 134 of the first suspension member 122. In other embodiments, the resilient material of the resilient pad 134 may have different properties than the resilient material 134 of the first suspension member 122.

Together, the first and second suspension members 122, 124 are operable to absorb impacts at the wheel assembly $100_i$ in any given direction.

In some embodiments, the first and second suspension members 122, 124 of the suspension 120 may be implemented separately. That is, in some cases, the suspension 120 may comprise only one of the first suspension member 122 and the second suspension member 124.

IV. Ease of Installation of the Drive Wheel

In some embodiments, the drive wheel 24 may be designed such as to facilitate its installation onto the track system $16_i$.

Figure 19B:
FIG. 19B shows a front view of the drive wheel of FIG. 19A.
Figure 19A:
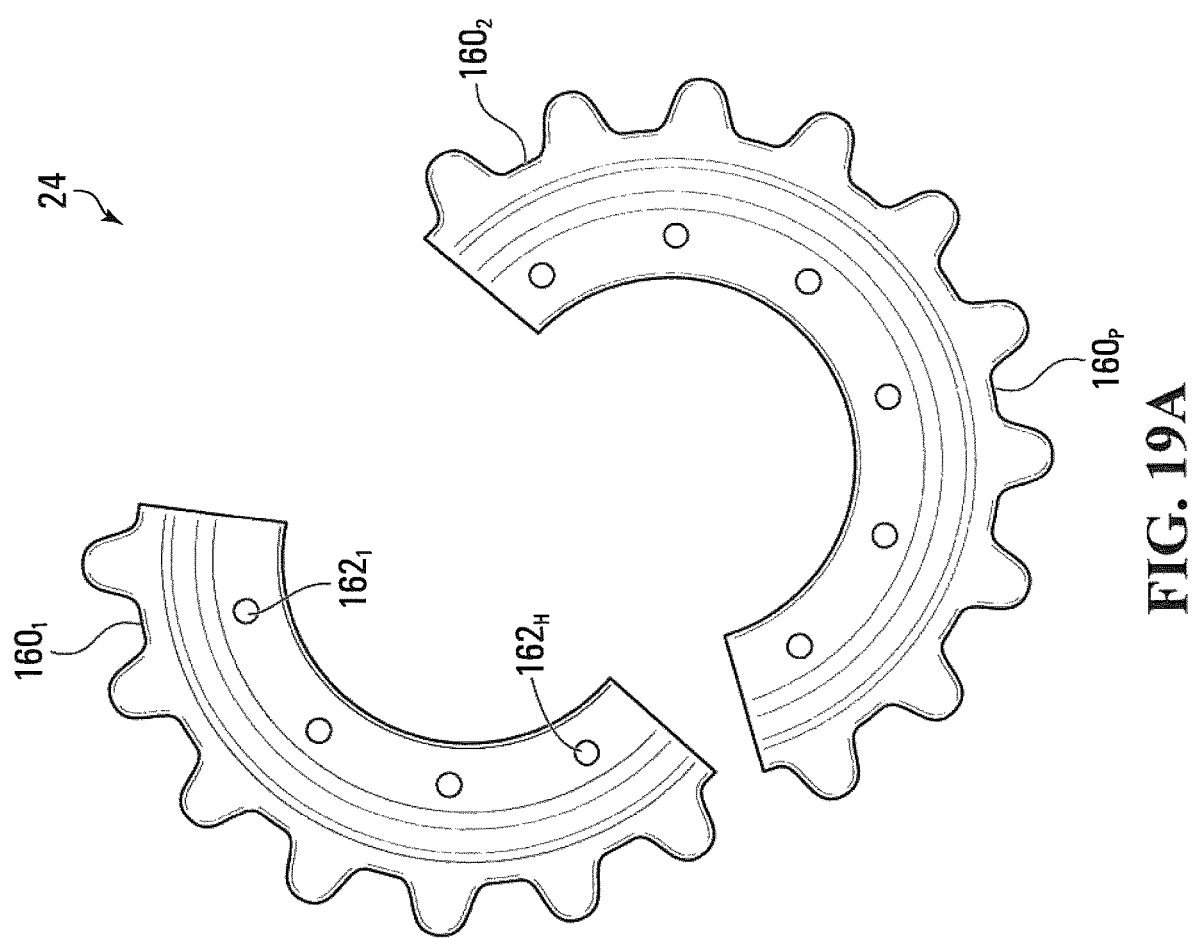
FIG. 19A shows a drive wheel of the track system in accordance with an embodiment in which the drive wheel comprises a plurality of drive wheel members.

For example, in this embodiment, as shown in FIG. 19, the drive wheel 24 comprises a plurality of drive wheel members $160_1$-$160_P$ separate from one another and which together form the drive wheel 24. This may facilitate the installation of the drive wheel 24 onto the track system $16_i$. For instance, since each drive wheel portion $160_i$ of the plurality of drive wheel portions $160_1$-$160_P$ is smaller than the resultant drive wheel 24, handling of the drive wheel portion $160_i$ may be easier than handling of the drive wheel 24 since the drive wheel portion $160_i$ is not as bulky and/or does not weigh as much as the drive wheel 24.

Each drive wheel portion $160_i$ is configured to be fastened to a drive hub of the track system $16_i$. The drive hub of the track system $16_i$ is connected to the powertrain of the vehicle 10 (e.g., via a drive axle of the vehicle 10) such that the drive hub of the track system $16_i$ is driven by the powertrain of the vehicle 10. More specifically, each drive wheel portion $160_i$ comprises a plurality of holes $162_1$-$162_H$ for receiving a fastening member (e.g., a threaded stud) therein. For example, the drive hub of the track system $16_i$ may comprise a plurality of fastening members which the plurality of holes $162_1$-$162_H$ of the drive wheel portion $160_i$ can engage. A complementary fastening member (e.g., a nut) may then engage the fastening member of the drive hub to secure the drive wheel portion $160_i$ to the drive hub of the track system $16_i$. The drive wheel portion $160_i$ may be fastened to the drive hub of the track system $16_i$ in any other suitable way in other embodiments.

This design of the drive wheel 24 may also facilitate a method used to install the drive wheel 24 onto the track system $16_i$. For example, this may allow the drive wheel 24 to be installed onto the track system $16_i$ after the track 22 has been disposed about the wheels $28_1$-$28_{10}$. More specifically, a first drive wheel portion $160_1$ can be installed at a "free portion" of the drive hub of the track system $16_i$, i.e., a portion of the drive hub that, where the drive wheel portion $160_1$ does not engage the track 22 when installed. The power train of the vehicle 10 is then actuated to cause the drive hub of the track system $16_i$ to turn by ⅓ of a turn (or ¼ of a turn if there are four drive wheel portions instead of three for example), the drive hub rotates such that the two remaining drive wheel portions $160_2$, $160_3$ can be installed onto the drive hub at a free portion of the drive hub.

V. Configuration of the Idler Wheels

The front and rear idler wheels 26, 29 of the track system $16_i$ may be configured in various ways.

In this embodiment, as shown in FIG. 20, an idler wheel assembly 200 is provided comprising the idler wheel 26. The idler wheel assembly 200 may be referred to as a "single idler" assembly since it comprises only one idler wheel. The idler wheel assembly 200 further comprises a shaft 202, a housing 204 and a mounting member 206. In this embodiment, the idler wheel 26 is symmetrical in a widthwise direction of the idler wheel assembly 200 (i.e., in a direction parallel to the widthwise direction of the track system $160_i$).

The shaft 202 is configured to be fixedly secured to a structural member that is connected to the frame 42 of the track system $16_i$. More specifically, the shaft 202 extends in the widthwise direction of the idler wheel assembly 200 and comprises an engagement feature 210 (e.g., a threaded hole) at each end portion of the shaft 202 for receiving therein a fastener that connects the shaft 202 to the structural member connected to the frame 42. The shaft 202 defines a rotation axis 203 of the idler wheel assembly 200.

The mounting member 206 is configured to securely receive the idler wheel 26. For instance, the idler wheel 26 is connected to the mounting member 206 in any suitable way (e.g., via a pressure fit). The mounting member 206 is also configured to be rotatably mounted to the shaft 202.

The housing 204 connects the mounting member 206 to the shaft 202. More specifically, the housing 204 comprises a plurality of housing portions $205_1$, $205_2$ that are fixedly secured to the shaft 202 (e.g., via a press-fit). Each housing portion $205_i$ is connected to an end of the mounting member 206 via a bushing 208. Alternatively, a bearing can be used.

As such, the shaft 202 and the housing 204 are fixed (i.e., remain stationary) while the mounting member 206 and the idler wheel 26 rotate about the rolling axis 203. Moreover, the mounting member 206 may comprise one or more lubrication conduits for feeding lubricant to the contact interface between the mounting member 206 and the shaft 202.

The idler wheel 26 is configured to interact with the wheel guide 52 of a core $44_i$ of the track 22. For instance, the idler wheel 26 is dimensioned to fit between the guide projections $56_1$, $56_2$ of the wheel guide 52.

This design of the idler wheel assembly 200 may help reduce a pressure exerted on the rolling paths $30_1$, $30_2$ of the track 22.

In some embodiments, as shown in FIG. 21, the idler wheel assembly 200 may comprise a pair of idler wheels $226_1$, $226_2$ mounted on the shaft 202 such that the idler wheels $226_1$, $226_2$ have a common rotation axis 203. The idler wheels $226_1$, $226_2$ are different from the idler wheel 26 in that each idler wheel $226_i$ is asymmetrical in the widthwise direction of the idler wheel assembly 200. The idler wheel assembly 200 may be referred to as a "double flange" idler wheel assembly since it comprises two idler wheels. In such an embodiment, the idler wheels $226_1$, $226_2$ engage the track 22 at a position outside of the wheel guide 52 and its guide projections $56_1$, $56_2$ (i.e., between the guide projection $56_1$ and the first longitudinal end $48_1$ of a core $44_i$ and between the guide projection $56_2$ and the second longitudinal end $48_2$ of the core $44_i$). This design of the idler wheel assembly 200 may help reduce vibrations induced by the engagement of the of idler wheel assembly 200 with the track 22.

In yet other embodiments, as shown in FIG. 22, the idler wheel assembly 200 may comprise a pair of idler wheels $226_1$, $226_2$ and an idler wheel 26 mounted between the pair of idler wheels $226_1$, $226_2$. All three of the idler wheels $226_1$ are mounted on the shaft 202. Each of the outer idler wheels $226_1$, $226_2$ is asymmetrical in the widthwise direction of the idler wheel assembly 200 whereas the central idler 26 wheel is symmetrical in the widthwise direction of the idler wheel assembly 200. In such embodiments, the central idler wheel 26 may engage a central portion of the track 22 between the guide projections $56_1$, $56_2$ of the wheel guide 52. This may improve a pressure distribution on the track 22 such as to reduce wear of the track 22. This design of the idler wheel assembly 200 may help reduce vibrations induced by the engagement of the of idler wheel assembly 200 with the track 22.

Figure 7:
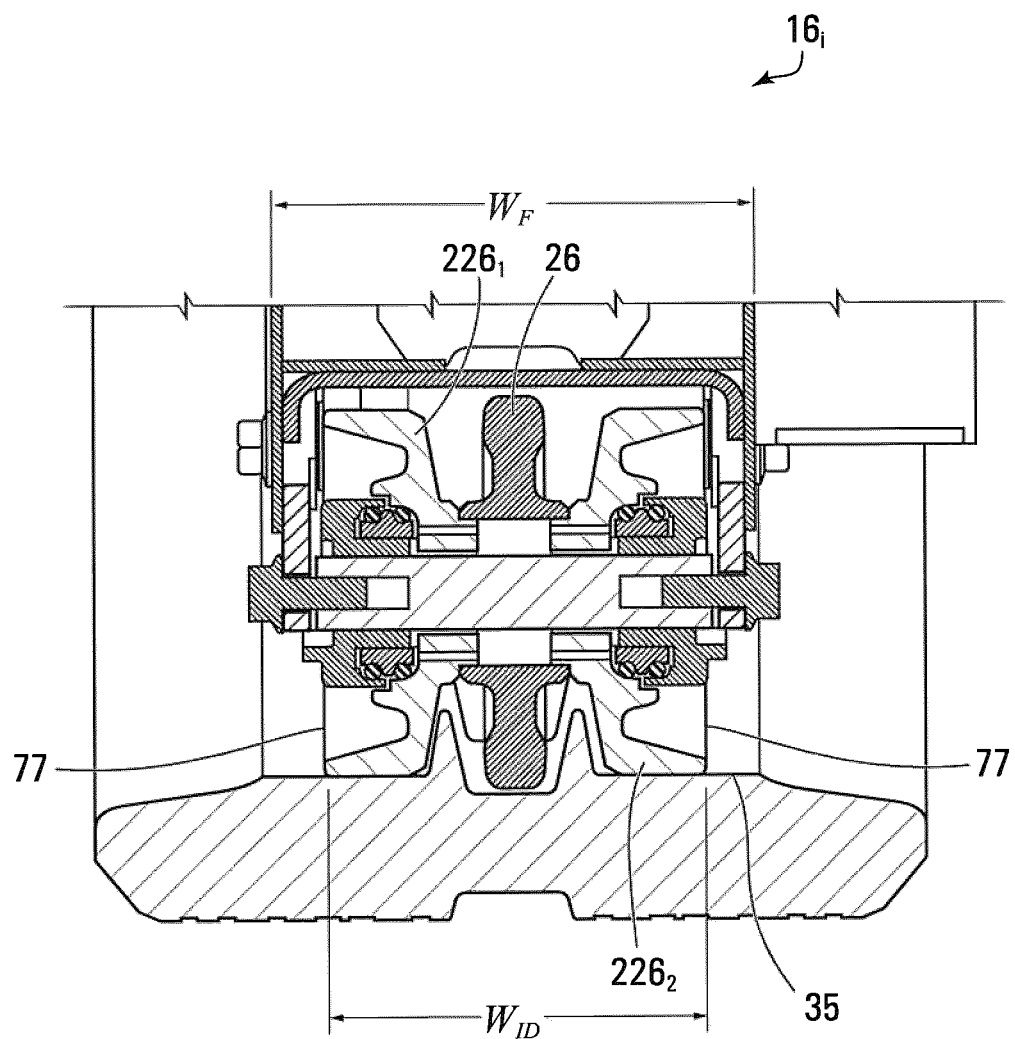
FIG. 7 shows a cross-sectional view of a portion of the track system, including the frame and an idler wheel of the track system.

As shown in FIGS. 3 and 7, in this embodiment, the front and rear idler wheels 26, 29 are mounted between the frame 42 while the frame 42 is located between laterally-adjacent ones of the roller wheels $28_1$-$28_{10}$. That is, in this embodiment, the idler wheel assembly 200 is bounded by the frame 42 in the widthwise direction of the track system $16_i$ such that a width $W_{ID}$ of the idler wheel assembly 200 (measured between outermost lateral edges 77 of the wheel(s) of the idler wheel assembly 200) is smaller than the widthwise extent $W_F$ of the frame 42 measured at a position of the idler wheel assembly 200. It will be appreciated that the widthwise extent $W_F$ of the frame 42 at a position of the roller wheels $28_1$-$28_{10}$ may be different from the widthwise extent $W_F$ of the frame 42 at the position of the idler wheel assembly 200 (i.e., the widthwise extent $W_F$ of the frame 42 may vary in the longitudinal direction of the track system $160_i$). A similar relationship may be applied between an idler wheel assembly comprising the rear idler wheel 29 and the frame 42.

The idler wheel assembly 200 may be configured in various other ways in other embodiments.

In a variant, the track 22 and the roller wheels $28_1$-$28_{10}$ may be configured to reduce a stress generated at a base of the wheel guide 52 of the cores $44_1$-$44_N$ (i.e., at a portion of the wheel guide 52 nearest to the wings $50_1$, $50_2$ of a core $44_i$). This may be useful to reduce wear of the track 22.

Figure 27:
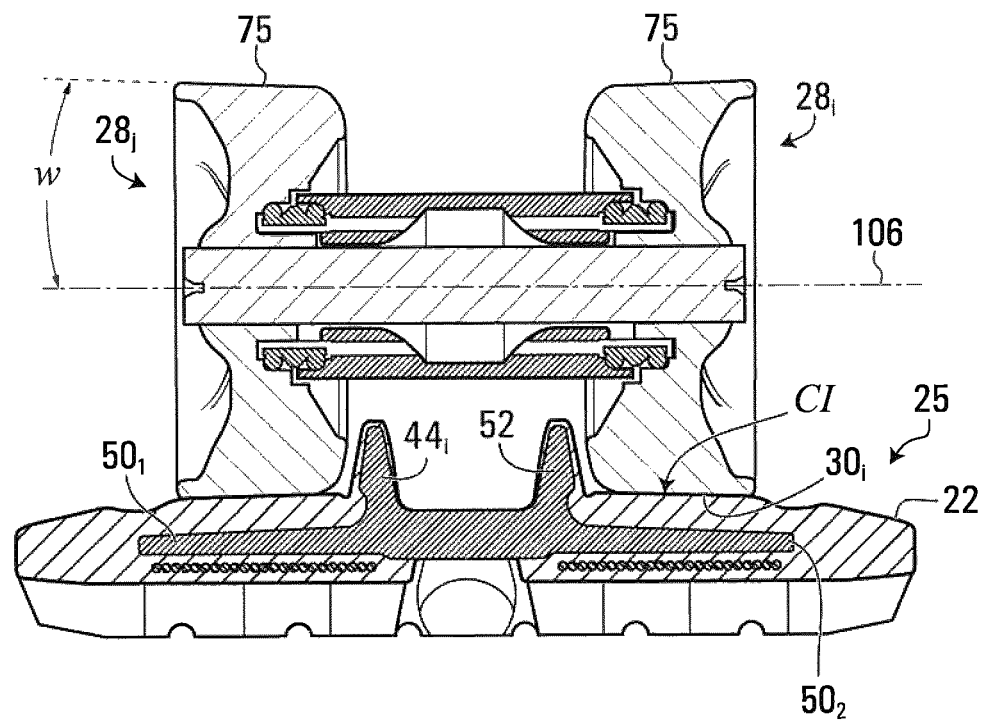
FIG. 27 shows a cross-sectional view of a track and a roller wheel in accordance to a variant of the track system.
Figure 28:
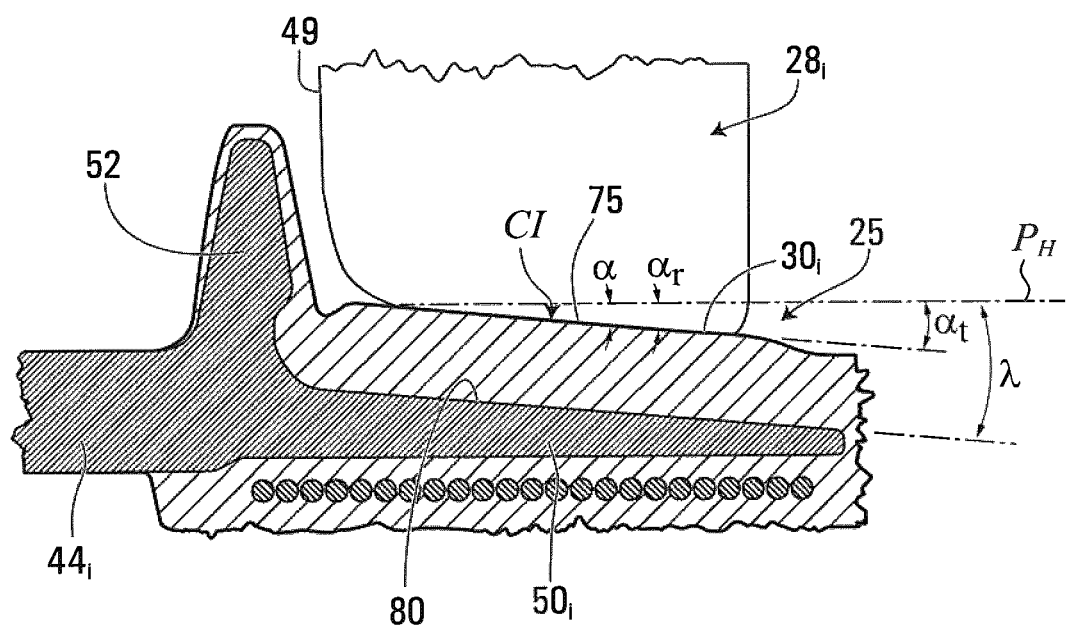
FIG. 28 shows a detailed view of a rolling contact interface between the roller wheel and the track of the track system of FIG. 27.

For instance, with additional reference to FIGS. 26 and 27, a rolling contact interface CI between a roller wheel $28_i$ and the inner side 25 of the track 22 may be configured to be nonparallel to the widthwise direction of the track 22. More particularly, the rolling contact interface CI between the peripheral surface 75 of the roller wheel $28_i$ and a corresponding rolling path $30_i$ of the inner side 25 of the track 22 may be configured to define an oblique angle α relative to a horizontal plane $P_H$ extending in the widthwise direction of the track 22. The angle a may take on various values in various embodiments. For example, in some embodiments, the angle a may be at least 1°, in some cases at least 2°, in some cases at least 3°, in some cases at least 4°, and in some cases even more (e.g.,) 6°.

Furthermore, the orientation of the rolling contact interface CI may be based on a configuration of the wings $50_1$, $50_2$ of the cores $44_1$-$44_N$ of the track 22. For instance, the rolling contact interface CI may be oriented in accordance to an orientation of a top surface 80 of a wing $50_i$ facing towards the inner side 25 of the track 22. In this example, the top surface 80 of the wing $50_i$ is nonparallel to the widthwise direction of the track 22. More specifically, the top surface 80 of the wing $50_i$ defines an oblique angle λ with the horizontal plane $P_H$ which extends in the widthwise direction of the track 22. The angle λ may take on various values in various embodiments. For example, in some embodiments, the angle λ may be at least 1°, in some cases at least 2°, in some cases at least 3°, in some cases at least 4°, and in some cases even more (e.g., 6°).

Thus, in this example, the peripheral surface 75 of the roller wheel $28_i$ is nonparallel to the widthwise direction of the track 22. That is, the peripheral surface 75 of the roller wheel $28_i$ defines an oblique angle $\alpha_r$ with the horizontal plane $P_H$. Moreover, the rolling surface $30_i$ of the inner side 25 of the track 22 is also nonparallel to the widthwise direction of the track 22. That is, the rolling surface $30_i$ of the inner side 25 of the track 22 defines an oblique angle $\alpha_t$ with the horizontal plane $P_H$. In this case, the angle $\alpha_t$ corresponds to the angle $\alpha_r$ such that the angle α of the rolling contact interface CI corresponds to the angles $\alpha_t$, $\alpha_r$ (i.e., $\alpha_t = \alpha_r = \alpha$). In other words, in this example, the peripheral surface 75 of the roller wheel $28_i$ and the rolling surface $30_i$ of the inner side 25 of the track 22 are parallel to one another. In other cases, the angle $\alpha_t$ defined by the rolling surface $33_i$ of the track 22 may be different from the angle $\alpha_r$ defined by the wheel $28_i$. For example, in some embodiments, a ratio of the angle $\alpha_r$ to the angle $\alpha_t$ may be between 0.8 and 1.2, in some cases between 0.9 and 1.1, and in some cases between 0.95 and 1.05. In cases where the angles $\alpha_t$, $\alpha_r$ are different, the angle α of the rolling contact interface CI corresponds to an average of the angles $\alpha_t$, $\alpha_r$.

The angle $\alpha_r$ defined by the peripheral surface 75 of the roller wheel $28_i$ and the angle λ defined by the top surface 80 of the wing $50_i$ of the core $44_i$ may approximate one another. For instance, in some cases, a ratio of the angle $\alpha_r$ defined by the peripheral surface 75 of the roller wheel $28_i$ and the angle λ defined by the top surface 80 of the wing $50_i$ of the core $44_i$ may be between 0.8 and 1.2, in some cases between 0.9 and 1.1 and in some cases between 0.95 and 1.05. For example, the peripheral surface 75 of the roller wheel $28_i$ and the top surface 80 of the wing $50_i$ of the core $44_i$ may be substantially parallel.

Moreover, the angle $\alpha_t$ defined by the rolling path $30_i$ of the inner side 25 of the track 22 and the angle λ defined by the top surface 80 of the wing $50_i$ of the core $44_i$ may approximate one another. For instance, in some cases, a ratio of the angle $\alpha_t$ defined by the rolling path $30_i$ of the inner side 25 of the track 22 and the angle λ defined by the top surface 80 of the wing $50_i$ of the core $44_i$ may be between 0.8 and 1.2, in some cases between 0.9 and 1.1 and in some cases between 0.95 and 1.05. For example, the rolling path $30_i$ of the inner side 25 of the track 22 and the top surface 80 of the wing $50_i$ of the core $44_i$ may be substantially parallel.

Thus, the peripheral surface 75 of the roller wheel $28_i$, the top surface 80 of the wing $50_i$ of the core $44_i$, and the rolling path $30_i$ of the inner side 25 of the track 22 may be substantially parallel.

In this example, the roller wheel $28_i$ tapers in a direction generally parallel to the axis of rotation 106 of the roller wheel $28_i$ such that its peripheral surface 75 is nonparallel to the axis of rotation 106 of the roller wheel $28_i$. More specifically, in this example, the roller wheel $28_i$ tapers such that its outermost diameter is greater at an outboard side of the roller wheel $28_i$ (i.e., a side closest to a lateral edge $31_i$ of the track 22) than at an inboard side of the roller wheel $28_i$ (i.e., a side furthest to a lateral edge $31_i$ of the track 22). For example, the peripheral surface 75 of the roller wheel $28_i$ tapers in a direction parallel to the axis of rotation 106 of the roller wheel $28_i$ such that an outboard side of the peripheral surface 75 is closer to the ground-engaging outer side 27 of the track 22 than an inboard side of the peripheral surface 75. For instance, the peripheral surface 75 of the roller wheel $28_i$ defines an oblique angle ω relative to the axis of rotation 106 of the roller wheel $28_i$. For example, in some embodiments, the angle ω between the peripheral surface 75 of the roller wheel $28_i$ and the axis of rotation of the roller wheel $28_i$ may be at least 1°, in some cases at least 2°, in some cases at least 3°, in some cases at least 4°, and in some cases even more (e.g.,) 6°.

The tensioner 47 of the track system $16_i$ maintains the track 22 in tension. In this example, the tensioner 68 is connected between the frame 42 and a cam plate 85 of the track system $16_i$ that rotatably supports the drive wheel 24. The tensioner 47 thus urges the frame 42, and the idler wheels XXXX supported by the frame 47, away from the drive wheel 24 to maintain the track 22 in tension.

More particularly, in this embodiment, the tensioner 47 is a fluidic (i.e., fluid-based) tensioner, i.e., a hydraulic or pneumatic tensioner, which comprises a piston-cylinder mechanism 87 connected to a fluidic accumulator 89. The fluidic accumulator 89 is configured to receive a fluid (e.g., liquid, gas) and, in this embodiment, is integrated with the track system $16_i$. In particular, the fluidic accumulator 89 is contained within an envelope defined by the track 22 of the track system $16_i$ such that the fluidic accumulator 89 is disposed between the lateral edges $31_1$, $31_2$ of the track 22.

The piston-cylinder mechanism 87 has a first end portion 91 connected to the frame 42 and a second end portion 93 connected to the cam plate 85. In this example, the second end portion 93 of the piston-cylinder mechanism 87 is connected to the cam plate 85 at a location below the axis of rotation 21 of the drive wheel 24 and above the axis of rotation 43 of the rear idler wheel 29. Moreover, the first end portion 91 of the piston-cylinder mechanism 87 is connected to the frame 42 approximately at a midpoint of the track system 16 in the longitudinal direction of the track system $16_i$. The position of the piston-cylinder mechanism 87 may provide a greater clearance between the piston-cylinder mechanism 87 and the inner side 25 of the track 22.

A piston of the piston-cylinder mechanism 87 is movable relative to a cylinder of the piston-cylinder mechanism 87 between an extended position and a retracted position. Pressure of a fluid inside the piston-cylinder mechanism 87 urges the piston towards its extended position. As a result, the piston pushes on the cam plate 85 which biases the drive wheel 24 mounted thereon away from the front idler wheel 26, thereby maintaining the track 22 in tension. The tensioner 47 allows tension in the track 22 to be manually adjusted to a desired level before use and remains active during use to maintain the tension in the track 22 at the desired level.

The tensioner 47 may be constructed in various other ways and/or using various other materials in other embodiments. For example, in some embodiments, the tensioner 47 may comprise a coil spring or any other elastic object that deforms under stress and recovers its original configuration when the stress is released.

Although it is configured in a certain way in this embodiment, each track system $16_i$ of the vehicle 10, including its track 22, may be configured in various other ways in other embodiments.

For example, the track 22 may interact with the drive wheel 24 in other ways in other embodiments in order to be moved. For instance, in some embodiments, the inner side 25 of the track 22 may comprise a plurality of drive lugs that interact with the drive wheel 24 in order to cause the track 22 to be driven (i.e., the track system $16_i$ may implement a "positive drive" system), or may frictionally engage the drive wheel 24 to cause the track 22 to be driven (i.e., the track system 16 may implement a "friction drive" system).

Each track system $16_i$ may comprise different and/or additional components in other embodiments. For example, in some embodiments, the track system $16_i$ may comprise a front drive wheel (e.g., the idler wheel 26 may be replaced by a drive wheel) instead of or in addition to the drive wheel 24. As another example, in some embodiments, the track system $16_i$ may comprise more or less wheels such as the wheels $28_1$-$28_{10}$. As yet another example, rather than have a generally triangular configuration as in this embodiment, in other embodiments, the track system $16_i$ may have various other configurations (e.g., a generally linear configuration).

While in the embodiment considered above the vehicle 10 is a compact track loader, in other embodiments, the vehicle 10 may be any other type of construction vehicle (e.g., a bulldozer, a backhoe loader, an excavator, etc.) for performing construction work. In other examples, the vehicle 10 may be any other suitable type of tracked vehicle (e.g., an agricultural vehicle, a forestry vehicle, an all-terrain vehicle (ATV)) or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track system for traction of a vehicle, the track system comprising:
   a track to engage a ground, the track comprising elastomeric material, a ground-engaging outer side, an inner side opposite to the ground-engaging outer side, lateral edges, and a plurality of cores that are at least partially embedded in the elastomeric material and extend transversally to a longitudinal direction of the track, each core comprising a pair of wings and a wheel guide projecting on the inner side of the track and disposed between the pair of wings in a widthwise direction of the track; and a track-engaging arrangement to drive and guide the track around the track-engaging arrangement, the track-engaging arrangement comprising:

a drive wheel to impart movement to the track;

a leading idler wheel and a trailing idler wheel spaced apart in a longitudinal direction of the track system, a distance between an axis of rotation of the drive wheel and an axis of rotation of the leading idler wheel being different from a distance between the axis of rotation of the drive wheel and an axis of rotation of the trailing idler wheel;

a plurality of roller wheels disposed between the leading idler wheel and the trailing idler wheel in the longitudinal direction of the track system and spanning at least a majority of a width of the track in a widthwise direction of the track system; and a frame supporting the leading idler wheel, the trailing idler wheel, and the roller wheels, the frame being free of supporting structure for the roller wheels between the roller wheels and the lateral edges of the track.

2. The track system of claim 1, wherein the frame extends between laterally-adjacent ones of the roller wheels that are adjacent to one another in a widthwise direction of the track system.

3. The track system of claim 1, wherein a widthwise extent of the frame of in the widthwise direction of the track system is less than a distance between outer lateral edges of laterally-adjacent ones of the roller wheels that are adjacent to one another in a widthwise direction of the track system.

4. The track system of claim 3, wherein the widthwise extent of the frame is less than a distance between inner lateral edges of the laterally-adjacent ones of the roller wheels.

5. The track system of claim 1, wherein the core does not extend beyond outer lateral edges of each of the roller wheels in a widthwise direction of the track system.

6. The track system of claim 5, wherein longitudinal ends of the core are generally aligned with respective ones of the outer lateral edges of each of the roller wheels in the widthwise direction of the track system.

7. The track system of claim 5, wherein a distance between the outer lateral edges of each of the roller wheels in the widthwise direction of the track system is greater than a length of the core.

8. The track system of claim 1, wherein the frame extends between the leading idler wheel and the lateral edges of the track and between the trailing idler wheel and the lateral edges of the track.

9. A vehicle comprising the track system of claim 1.

10. The track system of claim 1, wherein a ratio of a sum of a width of a peripheral surface of a first one of the roller wheels in contact with the track and a width of a peripheral surface of a second one of the roller wheels in contact with the track laterally-adjacent to the first one of the roller wheels over the width of the track is at least 0.3.

11. The track system of claim 1, wherein a ratio of a sum of a width of a peripheral surface of a first one of the roller wheels in contact with the track and a width of a peripheral surface of a second one of the roller wheels in contact with the track laterally-adjacent to the first one of the roller wheels over the width of the track is at least 0.4.

12. The track system of claim 1, wherein a ratio of a sum of a width of a peripheral surface of a first one of the roller wheels in contact with the track and a width of a peripheral surface of a second one of the roller wheels in contact with the track laterally-adjacent to the first one of the roller wheels over the width of the track is at least 0.5.

13. The track system of claim 1, comprising a mount for resiliently interconnecting the frame of the track system and a frame of the vehicle.

14. The track system of claim 13, wherein the mount comprises a resilient material which is deformable to allow a camber between the track system and the frame of the vehicle.

15. A track system for traction of a vehicle, the track system comprising:

a track to engage the ground, the track comprising elastomeric material, a ground-engaging outer side, an inner side opposite to the ground-engaging outer side, lateral edges, and a plurality of cores that are at least partially embedded in the elastomeric material and extend transversally to a longitudinal direction of the track, each core comprising a pair of wings and a wheel guide projecting on the inner side of the track and disposed between the pair of wings in a widthwise direction of the track; and a track-engaging arrangement to drive and guide the track around the track-engaging arrangement, the track-engaging arrangement comprising:

a drive wheel to impart movement to the track;

a leading idler wheel and a trailing idler wheel spaced apart in a longitudinal direction of the track system, a distance between an axis of rotation of the drive wheel and an axis of rotation of the leading idler wheel being different from a distance between the axis of rotation of the drive wheel and an axis of rotation of the trailing idler wheel;

a plurality of roller wheels disposed between the leading idler wheel and the trailing idler wheel in the longitudinal direction of the track system and spanning at least a majority of a width of the track in a widthwise direction of the track system; and a frame supporting the leading idler wheel, the trailing idler wheel, and the roller wheels, the frame extending between laterally-adjacent ones of the roller wheels that are adjacent to one another in the widthwise direction of the track system.

16. The track system of claim 15, wherein a ratio of a sum of a width of a peripheral surface of a first one of the roller wheels in contact with the track and a width of a peripheral surface of a second one of the roller wheels in contact with the track laterally-adjacent to the first one of the roller wheels over the width of the track is at least 0.3.

17. The track system of claim 15, wherein a ratio of a sum of a width of a peripheral surface of a first one of the roller wheels in contact with the track and a width of a peripheral surface of a second one of the roller wheels in contact with the track laterally-adjacent to the first one of the roller wheels over the width of the track is at least 0.4.

18. The track system of claim 15, wherein a ratio of a sum of a width of a peripheral surface of a first one of the roller wheels in contact with the track and a width of a peripheral surface of a second one of the roller wheels in contact with the track laterally-adjacent to the first one of the roller wheels over the width of the track is at least 0.5.

19. A track system for traction of a vehicle, the vehicle comprising a frame, the track system comprising:

a track to engage the ground, the track comprising elastomeric material, a ground-engaging outer side, an inner side opposite to the ground-engaging outer side, and a plurality of cores that are at least partially embedded in the elastomeric material and extend transversally to a longitudinal direction of the track, each core comprising a pair of wings and a wheel guide projecting on the inner side of the track and disposed between the pair of wings in a widthwise direction of the track;

a track-engaging arrangement to drive and guide the track around the track-engaging arrangement, the track-engaging arrangement comprising:

a drive wheel to impart movement to the track;

a leading idler wheel and a trailing idler wheel spaced apart in a longitudinal direction of the track system, a distance between an axis of rotation of the drive wheel and an axis of rotation of the leading idler wheel being different from a distance between the axis of rotation of the drive wheel and an axis of rotation of the trailing idler wheel;

a plurality of roller wheels between the leading idler wheel and the trailing idler wheel; and a frame supporting the leading idler wheel, the trailing idler wheel, and the roller wheels;

and a mount for resiliently interconnecting the frame of the track system and the frame of the vehicle.

20. A track system for traction of a vehicle, the track system comprising:

a track comprising a ground-engaging outer side for engaging a ground, an inner side opposite to the ground-engaging outer side, and lateral edges, the track comprising:

elastomeric material; and a plurality of cores at least partially embedded in the elastomeric material, each core of the plurality of cores extending transversally to a longitudinal direction of the track;

and a track-engaging arrangement for driving and guiding the track around the track-engaging arrangement, the track-engaging arrangement comprising:

a drive wheel for driving the track; and a plurality of roller wheels for rolling on the inner side of the track along a bottom run of the track, wherein a rolling contact interface between a roller wheel of the plurality of roller wheels and the inner side of the track is nonparallel to a widthwise direction of the track and defines an oblique angle relative to the widthwise direction of the track.

21. A track for traction of a vehicle, the track being mountable around a track-engaging arrangement for driving and guiding the track around the track-engaging arrangement, the track-engaging arrangement comprising: a drive wheel for driving the track; and a plurality of roller wheels for rolling along a bottom run of the track; the track comprising:

a ground-engaging outer side for engaging the ground;

an inner side opposite to the ground-engaging outer side, the inner side comprising a rolling path for a roller wheel of the plurality of roller wheels, the rolling path being nonparallel to a widthwise direction of the track;

elastomeric material; and a plurality of cores at least partially embedded in the elastomeric material, each core of the plurality of cores extending transversally to a longitudinal direction of the track, each core comprising a pair of wings and a wheel guide projecting on the inner side of the track and disposed between the wings in the widthwise direction of the track.

22. A track system for traction of a vehicle, the track system comprising:

a track to engage the ground, the track comprising elastomeric material, a ground-engaging outer side, an inner side opposite to the ground-engaging outer side, lateral edges, and a plurality of cores that are at least partially embedded in the elastomeric material and extend transversally to a longitudinal direction of the track, each core comprising a pair of wings and a wheel guide projecting on the inner side of the track and disposed between the pair of wings in a widthwise direction of the track;

a track-engaging arrangement to drive and guide the track around the track-engaging arrangement, the track-engaging arrangement comprising:

a drive wheel to impart movement to the track;

a leading idler wheel and a trailing idler wheel spaced apart in a longitudinal direction of the track system, a distance between an axis of rotation of the drive wheel and an axis of rotation of the leading idler wheel being different from a distance between the axis of rotation of the drive wheel and an axis of rotation of the trailing idler wheel;

a plurality of roller wheels between the leading idler wheel and the trailing idler wheel; and a frame supporting the leading idler wheel, the trailing idler wheel, and the roller wheels;

and a tensioner to maintain the track in tension, the tensioner comprising a piston-cylinder mechanism and a fluidic accumulator that are disposed between the lateral edges of the track.

* * * * *